United States Patent
Nishida

(10) Patent No.: US 8,254,669 B2
(45) Date of Patent: Aug. 28, 2012

(54) DATA PROCESSING APPARATUS, COMPUTER PROGRAM PRODUCT, AND DATA PROCESSING METHOD FOR PREDICTING AN OPTIMUM FUNCTION BASED ON A CASE DATABASE AND IMAGE FEATURE VALUES CALCULATED BY A FEATURE-VALUE CALCULATING UNIT

(75) Inventor: Hirobumi Nishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1016 days.

(21) Appl. No.: 12/211,442

(22) Filed: Sep. 16, 2008

(65) Prior Publication Data

US 2009/0074288 A1 Mar. 19, 2009

(30) Foreign Application Priority Data

| Sep. 19, 2007 | (JP) | 2007-242680 |
| Sep. 19, 2007 | (JP) | 2007-242681 |
| Sep. 19, 2007 | (JP) | 2007-242682 |
| Sep. 19, 2007 | (JP) | 2007-242683 |
| Jul. 11, 2008 | (JP) | 2008-181698 |

(51) Int. Cl.
- G06K 9/62 (2006.01)
- G06K 9/34 (2006.01)
- G06K 9/46 (2006.01)
- G06K 9/66 (2006.01)

(52) U.S. Cl. ........ 382/155; 382/156; 382/176; 382/190; 382/195

(58) Field of Classification Search .................... None
See application file for complete search history.

(56) References Cited

U.S. PATENT DOCUMENTS

| 4,237,539 | A | * | 12/1980 | Piovoso et al. | 702/35 |
| 5,214,715 | A | * | 5/1993 | Carpenter et al. | 382/157 |
| 5,430,808 | A | | 7/1995 | Baird et al. | |
| 5,647,021 | A | | 7/1997 | Baird et al. | |
| 5,978,100 | A | * | 11/1999 | Kinjo | 358/453 |
| 6,879,718 | B2 | * | 4/2005 | Hullender | 382/187 |
| 7,149,347 | B1 | * | 12/2006 | Wnek | 382/159 |
| 7,580,551 | B1 | * | 8/2009 | Srihari et al. | 382/115 |

(Continued)

FOREIGN PATENT DOCUMENTS

JP 2000-113103 4/2000

(Continued)

OTHER PUBLICATIONS

Jisheng Liang, et al., "Performance Evaluation of Document Structure Extraction Algorithms", Computer Vision and Image Understanding, vol. 84, 2001, pp. 144-159.

(Continued)

Primary Examiner — Tom Y Lu
Assistant Examiner — Thomas Conway
(74) Attorney, Agent, or Firm — Oblon, Spivak, McClelland, Maier & Neustadt, L.L.P.

(57) ABSTRACT

A data processing apparatus includes a feature-value calculating unit that calculates an image feature value indicating a feature of image data, a case database including a case set including a correspondence of image feature values and functions, and an optimum-function predicting unit that predicts an optimum function based on the case database and the image feature value calculated by the feature-value calculating unit. Due to the optimum-function predicting unit, work efficiency of a user can be improved.

19 Claims, 17 Drawing Sheets

U.S. PATENT DOCUMENTS

| | | |
|---|---|---|
| 7,587,064 B2 * | 9/2009 | Owechko et al. ............. 382/103 |
| 7,949,186 B2 * | 5/2011 | Grauman et al. ............. 382/170 |
| 2006/0039608 A1 | 2/2006 | Nishida |
| 2007/0065045 A1 | 3/2007 | Iwasaki |
| 2007/0171473 A1 | 7/2007 | Iwasaki |
| 2007/0171482 A1 | 7/2007 | Iwasaki |

FOREIGN PATENT DOCUMENTS

| | | |
|---|---|---|
| JP | 3215163 | 7/2001 |
| JP | 3253356 | 11/2001 |
| JP | 3441500 | 6/2003 |
| JP | 2003-281526 | 10/2003 |
| JP | 2004-320701 | 11/2004 |
| JP | 2005-63055 | 3/2005 |
| JP | 2005-110184 | 4/2005 |
| JP | 2006-53690 | 2/2006 |
| JP | 3771047 | 2/2006 |
| JP | 2006-74331 | 3/2006 |
| JP | 2006-85665 | 3/2006 |
| JP | 3792411 | 4/2006 |
| JP | 3850995 | 9/2006 |

OTHER PUBLICATIONS

Roberto Paredes, et al., "Learning Weighted Metrics to Minimize Nearest-Neighbor Classification Error", IEEE Transactions on Pattern Analysis and Machine Intelligence, vol. 28, No. 7, Jul. 2006, pp. 1100-1110.

* cited by examiner

CHARACTER AREA

PHOTOGRAPH AREA

CHARACTER AREA

PHOTOGRAPH AREA

FIG. 20A
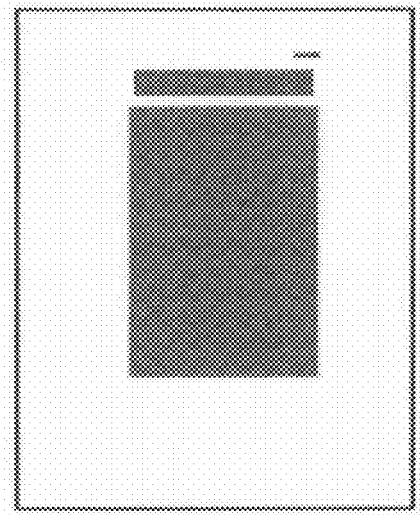
CHARACTER AREA
FIG. 20B
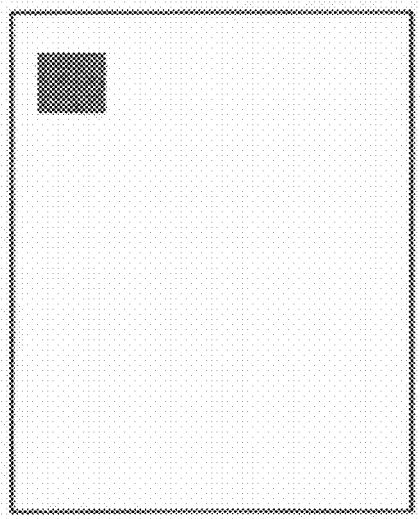
PHOTOGRAPH AREA
FIG. 21
|  | (a) | (b) | (c) | (d) | (e) | (f) |
|---|---|---|---|---|---|---|
| RATIOS OF CHARACTERS AND PHOTOGRAPHS | 25.2% 65.9% | 43.4% 5.5% | 26.4% 0.0% | 9.3% 65.9% | 48.3% 45.0% | 37.9% 0.0% |
| DENSENESS RATIO | 94.3% | 71.0% | 30.5% | 75.2% | 96.6% | 63.8% |
| DEGREES OF SCATTERING OF CHARACTERS AND PHOTOGRAPHS | 1.13, 1.24 | 0.78, 0.07 | 1.21, 0.0 | 1.44, 0.96 | 0.98, 0.88 | 0.62, 0.0 |
| BEST SYSTEM | B | A | C | B | A | D |

DATA PROCESSING APPARATUS, COMPUTER PROGRAM PRODUCT, AND DATA PROCESSING METHOD FOR PREDICTING AN OPTIMUM FUNCTION BASED ON A CASE DATABASE AND IMAGE FEATURE VALUES CALCULATED BY A FEATURE-VALUE CALCULATING UNIT

CROSS-REFERENCE TO RELATED APPLICATIONS

The present application claims priority to and incorporates by reference the entire contents of Japanese priority document 2007-242680 filed in Japan on Sep. 19, 2007, Japanese priority document 2007-242681 filed in Japan on Sep. 19, 2007, Japanese priority document 2007-242682 filed in Japan on Sep. 19, 2007, Japanese priority document 2007-242683 filed in Japan on Sep. 19, 2007 and Japanese priority document 2008-181698 filed in Japan on Jul. 11, 2008.

BACKGROUND OF THE INVENTION

1. Field of the Invention

The present invention relates to a technology for predicting an optimum function for image data in a data processing apparatus.

2. Description of the Related Art

In recent years, with the spread of color scanners and digital cameras, a printed document is scan-input and document image data of the scan-input printed document is accumulated, output, and reused by user terminals. Moreover, like encoded electronic document data, the scan-input document image data is transmitted to a remote location via a network.

This means that, on the network, document data is circulated in a form of scanned document image data or encoded electronic document data. The scanned document image data or the encoded electronic document data is transmitted and accumulated between user terminals over the network so that users use that data according to tasks or preferences.

For later reuse of data, it is desirable to classify the data according to criteria determined by the users when storing the data in storage members.

Conventional technologies of a document classification system for classifying data are disclosed in, for example, Japanese Patent No. 3441500, Japanese Patent No. 3792411, and Japanese Patent No. 3771047. In the document classification system, data is classified based on language information such as keywords extracted from electronic document data or keywords extracted from document image data read by an optical character reader.

When a system is to handle electronic document data and document image data (hereinafter, "document data") in optimum forms for various purposes of use, the system needs to support various types of document data depending on various preferences and purposes of use of users. In particular, in recent documents, layouts and coloring are much more diversified. Therefore, in classifying document data, it is necessary to pay attention to not only language information such as keywords but also features of images.

In classifying the document data based on features of images, because it is difficult to represent the features of the images with "language" and "signs", it may be difficult for users to designate classification criteria.

Moreover, because classification criteria are different for different users, each user has to designate a classification category for each of a large quantity of images. Therefore, a burden is imposed on the users and work efficiency degrades.

SUMMARY OF THE INVENTION

It is an object of the present invention to at least partially solve the problems in the conventional technology.

According to an aspect of the present invention, there is provided a data processing apparatus that includes a feature-value calculating unit that calculates an image feature value indicating a feature of image data; a case database including a case set including a correspondence of image feature values and functions; and an optimum-function predicting unit that predicts an optimum function based on the case database and the image feature value calculated by the feature-value calculating unit.

According to another aspect of the present invention, there is provided a data processing method that is executed by a data processing apparatus including a control unit and a storing unit, and that includes calculating an image feature value indicating a feature of image data; and predicting an optimum function based on a case database, the case data base including a case set including a correspondence of image feature values and functions, and the image feature value calculated at the calculating.

According to still another aspect of the present invention, there is provided a computer program product that includes a computer usable medium having computer readable program codes embodied in the medium that, when executed, causes a computer to implements the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 20A and 20B are schematic diagrams of correct images prepared as results of the area extraction from images shown in FIG. 8B;

FIG. 21 is a table of an example of supervised feature value data;

DETAILED DESCRIPTION OF THE PREFERRED EMBODIMENTS

Exemplary embodiments of the present invention are explained in detail below with reference to the accompanying drawings.

Figure 1:
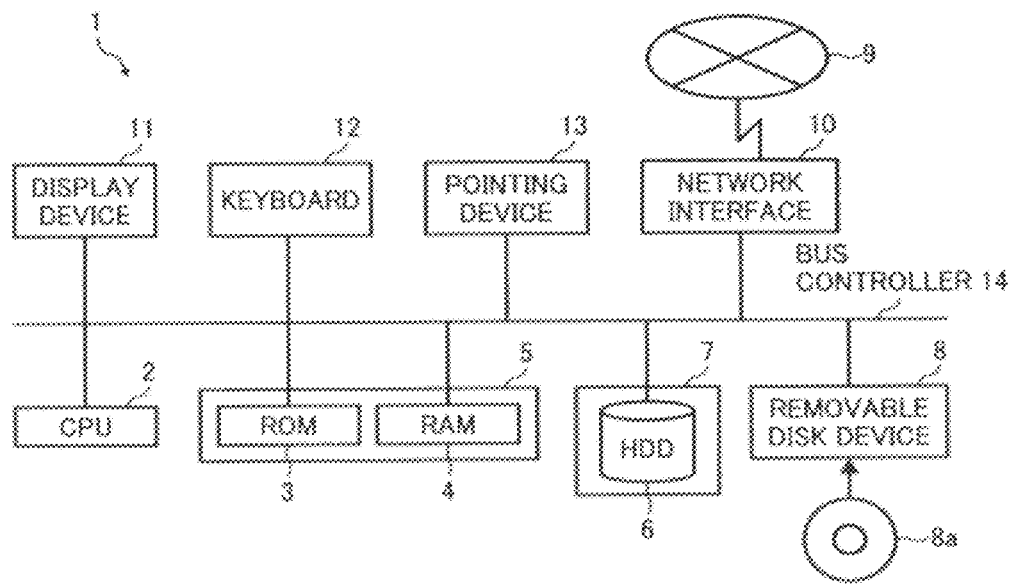
FIG. 1 is a block diagram of electric connection of a data processing apparatus according to a first embodiment of the present invention.

FIG. 1 is a block diagram of electric connection of a data processing apparatus 1 according to a first embodiment of the present invention. The data processing apparatus 1 is a computer such as a personal computer (PC). The data processing apparatus 1 includes a CPU 2 that centrally controls respective units of the data processing apparatus 1, a primary storage device 5 including a ROM 3 and a RAM 4 that store therein information, a secondary storage device 7 including an HDD 6 as a storing unit that stores therein data files (e.g., color bitmap image data), a removable disk device 8 such as a CD-ROM drive for storing therein information, distributing information to the outside, and acquiring information from the outside, a network interface (I/F) 10 for transmitting information through communication with other computers on the outside via a network 9, a display device 11 such as a cathode ray tube (CRT) or a liquid crystal display (LCD) that displays a processing progress, a result, and the like to an operator, a keyboard 12 for the operator to input commands, information, and the like to the CPU 2, and a pointing device 13 such as a mouse. Data transmitted and received among these units is arbitrated by a bus controller 14, whereby the data processing apparatus 1 operates.

In the explanation of the embodiments, a general personal computer is applied as the data processing apparatus 1. However, the data processing apparatus 1 is not limited to the personal computer and can be a portable information terminal called personal digital assistant (PDA), a palm-top PC, a cellular phone, a personal handyphone system, and the like.

In the data processing apparatus 1, when a user turns on a power supply, the CPU 2 boots up a computer program called loader in the ROM 3, reads a computer program for managing hardware and software of the computer called operating system from the HDD 6 to the RAM 4, and boots up the operating system. Such an operating system boots up a computer program, reads information, and stores information, based on the operation by the user. As representative operating systems, WINDOWS (a registered trademark), UNIX (a registered trademark), and the like are known. An operation program running on these operating systems is called application program.

The data processing apparatus 1 stores an image processing program in the HDD 6 as the application program. In this sense, the HDD 6 functions as a storage medium that stores therein the image processing program.

In general, an application program installed in the secondary storage device 7 including the HDD 6 of the data processing apparatus 1 is recorded in a storage medium 8a such as an optical information recording medium like a CD-ROM or a DVD-ROM or a magnetic medium like an FD. The application program recorded in the storage medium 8a is installed in the secondary storage device 7 including the HDD 6. Therefore, the storage medium 8a having portability such as an optical information recording medium or a magnetic medium can also be a storage medium that stores therein the image processing program. Moreover, the image processing program can be stored on a computer connected to a network such as the Internet and downloaded from the outside via, for example, the network I/F 10 to be installed in the secondary storage device 7 including the HDD 6. The image processing program executed in the data processing apparatus 1 can be provided or distributed through a network such as the Internet.

In the data processing apparatus 1, when the image processing program to be run on the operating system is booted up, the CPU 2 executes various kinds of arithmetic processing and centrally controls the respective units by the image processing program. Image processing among the various kinds of arithmetic processing executed by the CPU 2 is explained in detail below.

When real time processing is to be attained, it is necessary to speed up the processing. For that purpose, it is desirable to separately provide a logic circuit (not shown) and execute the various kinds of arithmetic processing by operations of the logic circuit.

Figure 2:
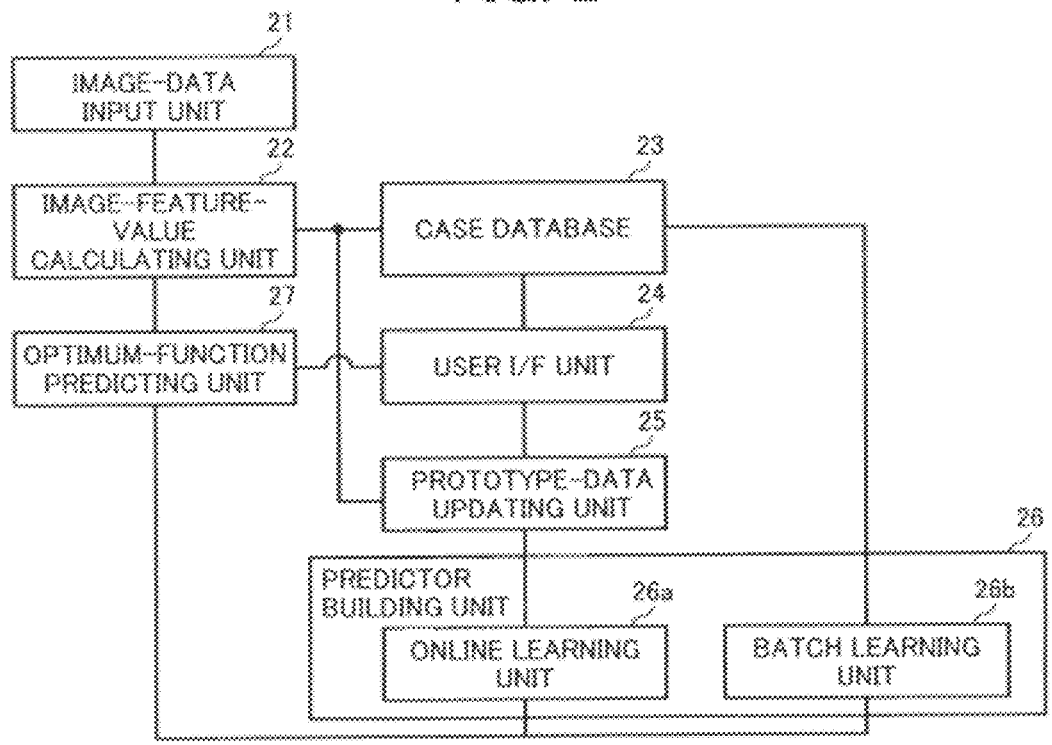
FIG. 2 is a functional block diagram of image processing functions of the data processing apparatus shown in FIG. 1.
Figure 3:
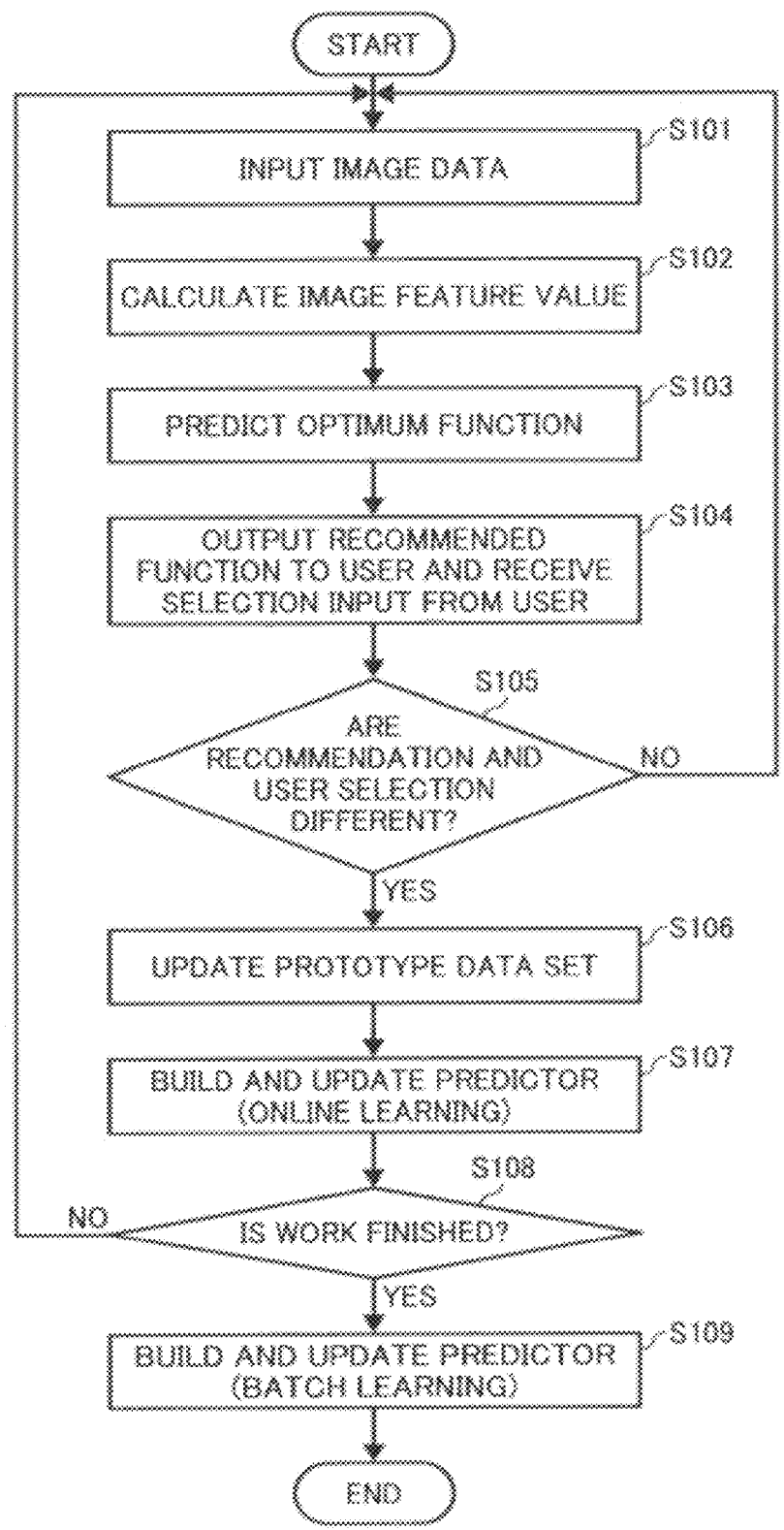
FIG. 3 is a flowchart of a processing procedure of the image processing.

FIG. 2 is a functional block diagram of functions for image processing executed by the CPU 2 of the data processing apparatus 1. FIG. 3 is a flowchart of a processing procedure of the image processing. As shown in FIG. 2, the data processing apparatus 1 includes an image-data input unit 21, an image-feature-value calculating unit 22 that functions as feature-value calculating means for calculating image feature values for respective image data, a case database 23 for each of users and in which an output of the image-feature-value calculating unit 22 and a selection made by the user are recorded as a set, a user I/F unit 24 that functions as input receiving means for receiving an input from the user and returning an output to the user, a predictor building unit 26 that functions as predictor building means for building a predictor, a prototype-data updating unit 25 that functions as updating means for updating prototype data set used for building the predictor, and an optimum-function predicting unit 27 that functions as optimum-function predicting means. The predictor building unit 26 includes an online learning unit 26a that functions as sequential building means and a batch learning unit 26b that functions as batch building means. As an advantage of this configuration, the system becomes more intelligent (prediction accuracy increases) through the online learning unit 26a even during work by the user and it is possible to keep high prediction accuracy by starting the batch learning unit 26b in idle time after work is finished.

In the image processing, the image-data input unit 21 inputs unknown image data (Step S101). The image-feature-value calculating unit 22 calculates an image feature value from the image data output from the image-data input unit 21

(Step S102). The optimum-function predicting unit 27 predicts an optimum function using a predictor built by the predictor building unit 26 (Step S103). Thereafter, the user I/F unit 24 presents the optimum function, which is output from the optimum-function predicting unit 27, to the user by displaying the optimum function on a screen or the like of the display device 11 as a recommended function and receives a selection input for a function from the user (Step S104). When the recommended function and the function selected by the user coincide with each other (NO at Step S105), process control returns to Step S101 and stands by for an input of the next image data. On the other hand, when the recommended function and the function selected by the user are different (YES at Step S105), considering that a purpose of the user is changed and the prediction is wrong, the prototype-data updating unit 25 updates a prototype data set (Step S106). The predictor building unit 26 (the online learning unit 26a) rebuilds a predictor using the case database 23 (Step S107). When it is judged that the work is finished (YES at Step S108), the predictor building unit 26 (the batch learning unit 26b) rebuilds a predictor using the prototype data set obtained by online learning (Step S109).

Operations and actions of the respective units are explained in detail below.

If input image data is scanned document image data, the image-data input unit 21 performs pre-processing on the document image data, for example, performs "skew correction" for correcting a tilt of a document on the document image data.

The image-feature-value calculating unit 22 receives the document image data output from the image-data input unit 21 and outputs an image feature value representing content of the document image data to the case database 23 and the optimum-function predicting unit 27.

The image feature value can be formed as combination of a vector obtained based on frequencies of "Bag-Of-Words", i.e., frequency of words present in a document, and a vector obtained based on feature values of document images such as those disclosed in, for example, Japanese Patent No. 3253356 and Japanese Patent No. 3215163. As an example, a method of calculating a continuous feature value vector representing a layout feature of a document is explained below.

Figure 4:
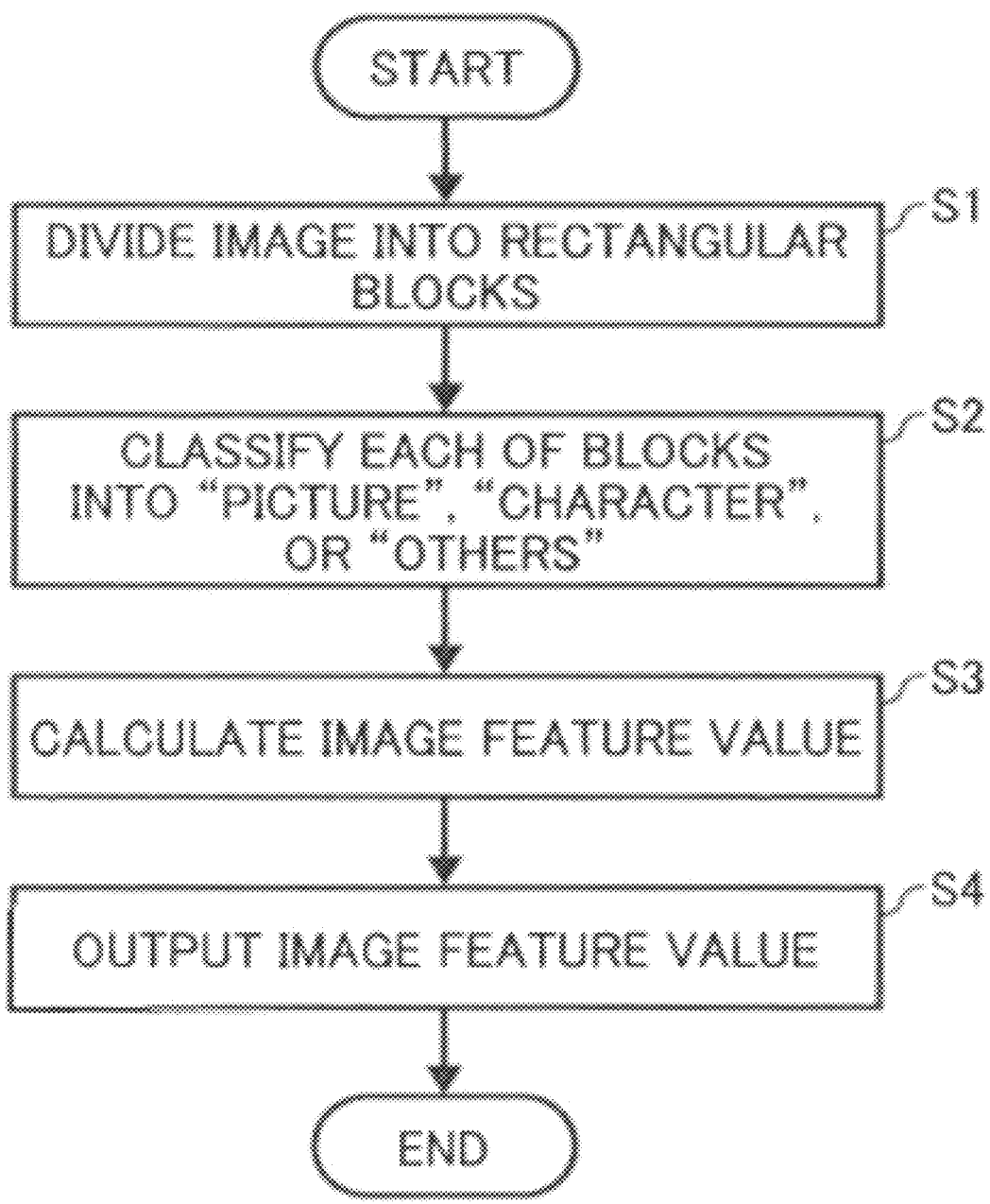
FIG. 4 is a flowchart of a processing procedure of image feature value calculation processing.

FIG. 4 is a flowchart of a processing procedure of image feature value calculation processing by the image-feature-value calculating unit 22. The image-feature-value calculating unit 22 exclusively divides an input image into rectangular blocks of the same size (Step S1). The image-feature-value calculating unit 22 classifies the respective blocks into any one of "picture", "character", and "others" (Step S2). The image-feature-value calculating unit 22 calculates an image feature value of the entire image based on classification results of all the blocks (Step S3). Finally, the image-feature-value calculating unit 22 outputs the image feature value of the entire image (Step S4). The operations in the respective Steps are further explained below.

At Step S1, the image-feature-value calculating unit 22 divides the input image into blocks of the same size, for example, rectangles of 1 centimeter×1 centimeter (80 pixels× 80 pixels at the resolution of 200 dots per inch (dpi) or 120 pixels×120 pixels at the resolution of 300 dpi)

Figure 5:
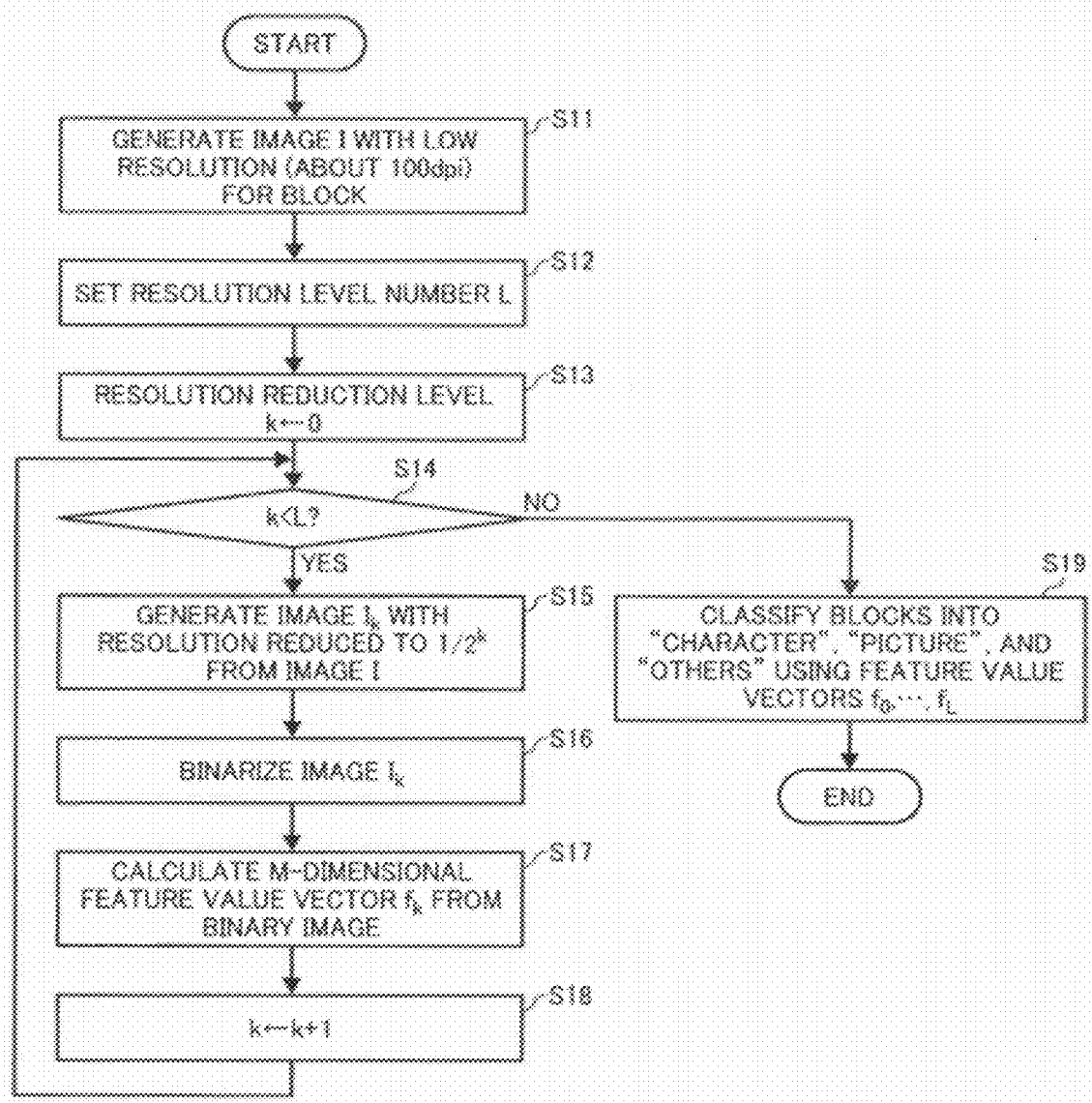
FIG. 5 is a flowchart of a processing procedure of block classification processing.

At Step S2, the image-feature-value calculating unit 22 classifies the respective blocks into any one of "picture", "character", and "others". A flow of this processing is shown in FIG. 5 and explained in detail below.

Figure 6:
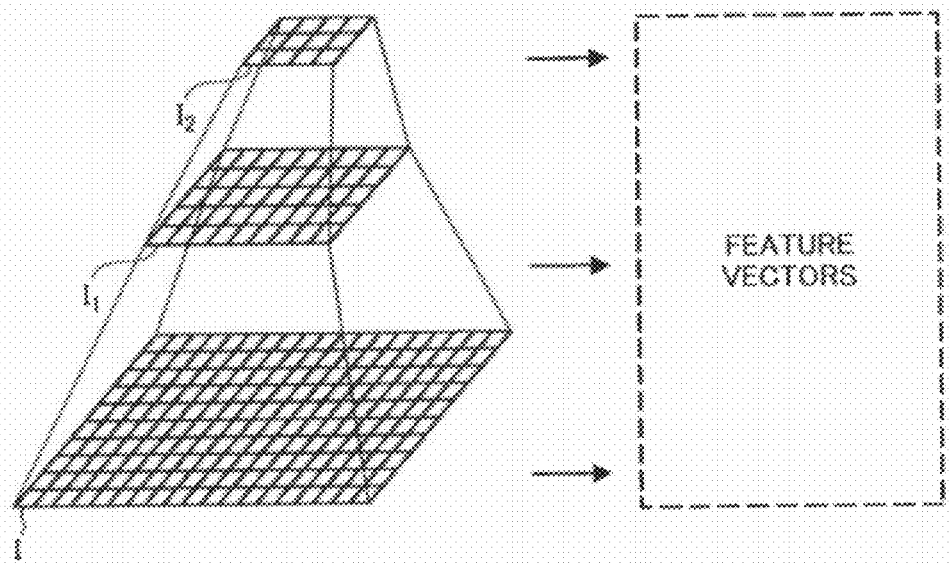
FIG. 6 is a schematic diagram for explaining multi-resolution processing.

The image-feature-value calculating unit 22 generates an image I by reducing the resolution of a block image as a processing object to low resolution of about 100 dpi (Step S11), sets a level number L of the resolution (Step S12), and initializes a resolution reduction level k (k←0) (Step S13). Such processing at Steps S11 to S13 is performed to extract features from an image, the resolution of which is further reduced, together with the image I as shown in FIG. 6. As explained in detail below, for example, when the resolution level number L is set to 2, features are extracted from the image I, an image $I_1$ with half resolution of that of the image I, and an image $I_2$ with quarter resolution of that of the image I.

When the resolution reduction level k has not reached the resolution level number L (YES at Step S14), the image-feature-value calculating unit 22 generates an image $I_k$ (k=0, ..., L) with the resolution reduced to $1/2^k$ from the image I generated at Step S11 (Step S15) and binarizes the image $I_k$ (Step S16: binarizing means). It is assumed that, in the binarized image, black pixels take a value 1 and white pixels take a value 0.

Subsequently, after calculating an M-dimensional feature value vector $f_k$ from the binarized image $I_k$ with the $1/2^k$ resolution (Step S17), the image-feature-value calculating unit 22 increments the resolution reduction level k by "1" (k←k+1) (Step S18).

Figure 7:
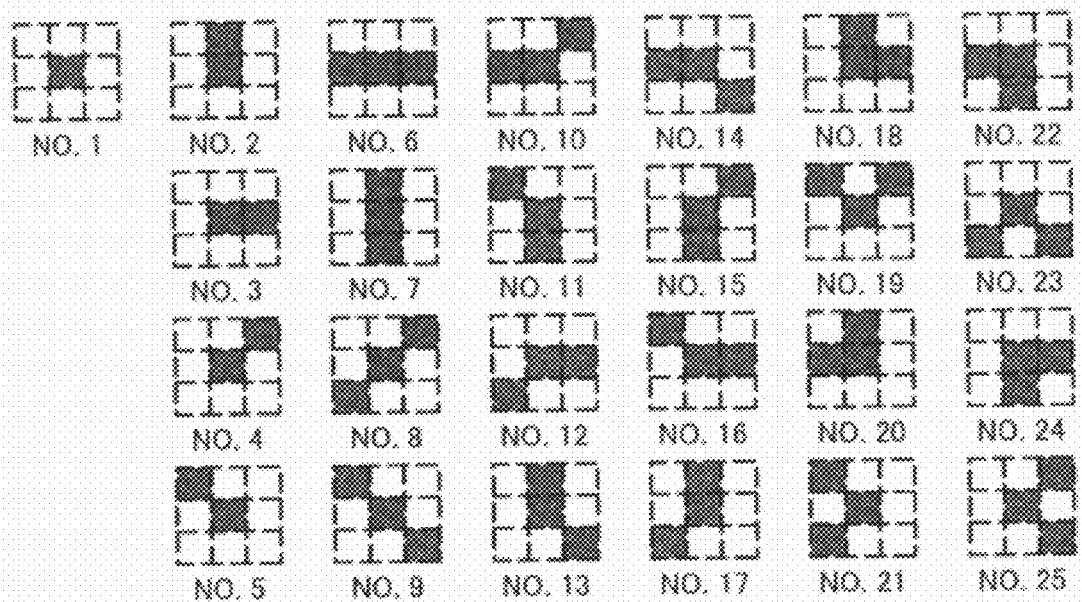
FIG. 7 is a schematic diagram of an example of a mask pattern for a high-order auto-correlation function calculation.
Figure 8A:
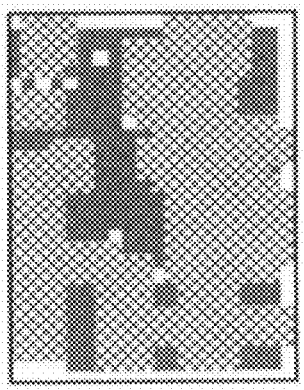
FIGS. 8A to 8F are schematic diagrams of examples of block classification.
Figure 8B:
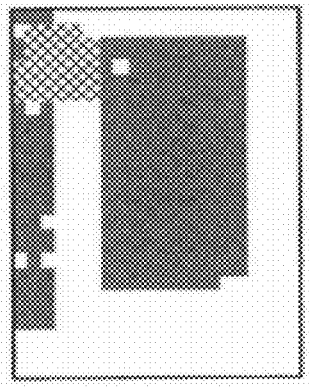
Figure 8C:
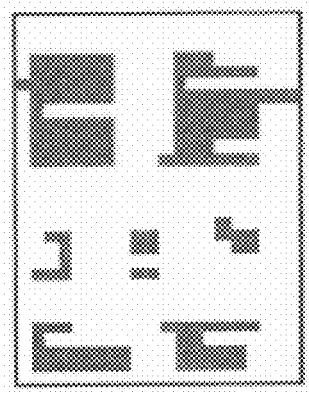
Figure 8D:
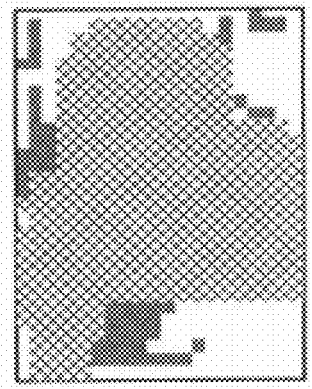
Figure 8E:
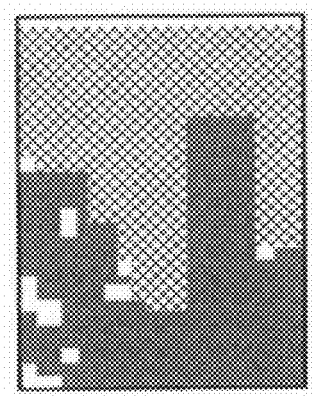
Figure 8F:
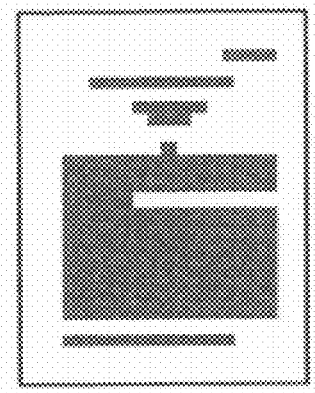

A method of extracting features from an image formed by binarizing the image $I_k$ (k=0, ..., L) is explained below. A "high-order autocorrelation function (Nth-order autocorrelation function)" obtained by expanding an autocorrelation function to a high order (an Nth order) is defined by the following Expression (1) with respect to a displacement direction $(s_1, s_2, ..., s_N)$ when an object image in a screen is I(r).

$$z^N(s_1, s_2, ..., s_N) = \sum_r I(r)I(r+s_1) ... I(r+s_N) \quad (1)$$

where, a sum Σ is an addition for pixels of the entire image. Therefore, innumerable high-order autocorrelation functions are conceivable depending on how an order and the displacement direction $(s_1, s_2, ..., s_N)$ are set. It is assumed that the order N of the high-order autocorrelation function is "2" at the maximum. The displacement direction is limited to a local area of 3×3 pixels around a reference pixel r. When equivalent features are excluded by translation, as shown in FIG. 7, a total number of features is twenty-five with respect to the binarized image. As the calculation of the respective features, products of corresponding pixels of a local pattern only have to be added up for all images. For example, a feature corresponding to a local pattern "No. 3" in FIG. 7 is calculated by calculating a sum of products for all images of a shading value in the reference pixel r and a shading value at a point just on the right of the reference pixel r. In this way, an M=25 dimensional feature value vector $f_k=(g(k, 1), ..., g(k, 25))$ is calculated from the image with the $1/2^k$ resolution.

The processing at Steps S15 to S18 described above is repeated until the resolution reduction level k incremented at Step S18 exceeds the resolution level number L (NO at Step S14).

When the resolution reduction level k incremented at Step S18 has exceeded the resolution level number L (NO at Step S14), the image-feature-value calculating unit 22 classifies, based on feature value vectors $f_0, ..., f_L$, the blocks into any one of "picture", "character", and "others" (Step S19).

A method of classifying the blocks is explained in detail below. First, the image-feature-value calculating unit 22 generates a (25×L) dimensional feature value vector x=(g(0, 1), ..., g(0, 25), ..., g(L, 1), ..., g(L, 25)) from the M=25 dimensional feature value vector $f_k$=(g(k,1), ..., g(k, 25)) (k=0, ..., L). To perform classification using such a feature value vector x of the blocks, it is necessary to perform learning in advance. Therefore, in the first embodiment, the image-feature-value calculating unit 22 divides learning data into two kinds of learning data, i.e., learning data including only characters and learning data not including characters, and calculates feature value vectors x. Thereafter, the image-feature-value calculating unit 22 calculates an average of the feature value vectors x to calculate a feature value vector $p_0$ of character pixels and a feature value vector $p_1$ of non-character pixels in advance. If the feature value vector x obtained from a block image to be classified is decomposed into linear combination of the known feature value vectors $p_0$ and $p_1$, combination coefficients $a_0$ and $a_1$ represent a ratio of the character pixels and the non-character pixels or "character likelihood" and "non-character likelihood" of the blocks. Such decomposition is possible because features based on the high-order local autocorrelation are invariable in positions of objects in a screen and have additivity concerning the number of objects. The decomposition of the feature value vector x is represented as $x = a_0 \times p_0 + a_0 \times p_1 = F^T a + e$. Here, e is an error vector, $F = [p_0, p_1]^T$, and $a = (a_0, a_1)^T$. According to the least square method, an optimum combination coefficient vector "a" is given by $a = (FF^T)^{-1} \times Fx$. For each of the blocks, a parameter $a_1$ representing "non-character likelihood" is subjected to threshold processing to classify the block into "picture", "non-picture", and "undecided". When each of the blocks is classified into "undecided" or "non-picture" and if the parameter $a_0$ representing character likelihood is equal to or larger than a threshold, the block is classified into "character" and, if not, classified into "others". Examples of block classification are shown in FIGS. 8A to 8F. In the examples shown in FIGS. 8A to 8F, black sections represent "character", gray sections represent "picture", and white sections represent "others".

At Step S3, the image-feature-value calculating unit 22 calculates, based on a result of the classification of the blocks, an image feature value for classifying types of images. In particular, the image-feature-value calculating unit 22 calculates the following:

ratios of characters and pictures;

a denseness ratio: a degree of crowding of a layout (a degree of packing in a narrow place); and degrees of scattering of characters and pictures: a degree of scattering distribution of characters and pictures over an entire paper surface.

For example, the image-feature-value calculating unit 22 calculates the following five image feature values:

a ratio of characters Rt∈[0, 1]: a ratio of blocks classified into "character" among all the blocks;

a ratio of non-characters Rp∈[0, 1]: a ratio of blocks classified into "picture" among all the blocks;

layout density D∈[0, 1]: a ratio obtained by dividing a sum of areas of blocks of "character" and "picture" by an area of a rendering area;

a degree of scattering of characters St(>0): a degree obtained by normalizing a determinant of variance/covariance matrixes with an area of an image with respect to a spatial distribution in x and y directions of character blocks; and a degree of scattering of non-characters Sp(>0): a degree obtained by normalizing a determinant of variance/covariance matrixes with an area of an image with respect to a spatial distribution in x and y directions of picture blocks.

Besides these image feature values, features such as "character likelihood" and "non-character likelihood" can be calculated from a (25×L) dimensional feature calculated based on a high-order moment concerning special distributions in the x and y directions of the character blocks and the picture blocks or a high-order autocorrelation function in an entire image.

Table 1 is a calculation result of image feature values for the examples shown in FIGS. 8A to 8F.

TABLE 1

|  | 8A | 8B | 8C | 8D | 8E | 8F |
|---|---|---|---|---|---|---|
| Ratios of characters and pictures | 25.2%, 65.9% | 43.4% 5.5% | 26.4% 0.0% | 9.3% 65.9% | 48.3% 45.0% | 37.9% 0.0% |
| Denseness ratio | 94.3% | 71.0% | 30.5% | 75.2% | 96.6% | 63.8% |
| Degrees of scattering of characters and pictures | 1.13, 1.24 | 0.78, 0.07 | 1.21, 0.0 | 1.44, 0.96 | 0.98, 0.86 | 0.62, 0.0 |

As the image feature values, besides the layout statistics described above (ratios of characters and pictures in an image, degrees of scattering of characters and pictures, and layout density), a statistic amount obtained from distributions of colors and luminances, a statistic amount obtained from a distribution of edge intensities, "Bag-Of-Words", i.e., a vector obtained based on frequencies of words present in a document, or the like can be additionally used.

The case database 23 is a database that receives the image feature value output from the image-feature-value calculating unit 22 and a selection made by the user and output from the user I/F unit 24, and accumulates the image feature value and the selection as a case set H, which is learning data described below.

$$H = \{(x(1), \alpha(i)), (x(2), \alpha(2)), \ldots\}$$

x(k): an image feature value extracted from a k-th image

α(k): a function (an algorithm and a processing parameter) suitable for the image The predictor building unit 26 builds a predictor using a case set accumulated in the case database 23.

When a feature value set F representing image content, a set A of functions (algorithms and parameters), and the case set H are given, concerning an element u∈U of a user set U and given unknown image data, a function f representing suitableness $f_H(\alpha, x, u)$ of a classification category α∈A from the observed feature value vector x is built from the case set H.

$$f_H: A \times R^N \times U \to R \text{ (R is a real number)}$$

A different function f is built for each of different algorithm sets A.

Examples of the feature value set F representing image content include the following:

layout statistics: ratios of characters and pictures in an image, degrees of scattering of characters and pictures, and layout density;

spatial distributions of characters and pictures;

a background color; and distributions of colors and edges.

As the set A of algorithms and parameters, types described below are conceivable.

(1) Background Color Correction Processing

Background removal or background cleaning disclosed in, for example, Japanese Patent Application Laid-open No. 2004-320701 or Japanese Patent Application Laid-open No. 2005-110184 is applied or no processing is performed.

A={background removal, background cleaning, no processing}

(2) Spatial Filter Processing

Smoothing processing or edge enhancement processing is performed on the entire surface of a processing object image, processing unique to each of pixels (adaptive filtering) as disclosed in, for example, Japanese Patent Application Laid-open No. 2003-281526 is performed, or no processing is performed.

A={smoothing processing, edge enhancement processing, adaptive filtering, no processing}

(3) Resolution Expansion Processing

Processing for expanding the resolution of characters disclosed in, for example, Japanese Patent Application Laid-open No. 2005-063055 is performed, normal image interpolation is performed, or no processing is performed.

A={character resolution expansion, image interpolation, no processing}

This means that the function f for the algorithm set A of the "background color correction processing" and the function f for the algorithm set A of the "spatial filter processing" are separately built.

In terms of a framework of Bayesian identification, concerning the user u, the image feature value x, and the classification category α, $f_H(\alpha, x, u)$ can be formulated as a problem for calculating a probability described below.

$$P(\alpha \mid u, x) = p(\alpha \mid u) \times p(x \mid \alpha, u) / p(x \mid u)$$
$$= p(\alpha \mid u) \times p(x \mid \alpha, u) / \sum \alpha p(\alpha \mid u) \times p(x \mid \alpha, u)$$

Because p(x|u) is a normalization factor concerning an image, p(x|u) can be neglected when priority orders of a plurality of kinds of processing (α) are calculated. Therefore, $f_H(\alpha, x, u)$ can be set as follows:

$$f_H(\alpha, x, u) = p(\alpha \mid u) \times p(x \mid \alpha, u)$$

p(α|u) can be easily calculated from a history. Specifically, concerning the processing α, the number of times the processing is used is to be recorded for each of users. A distribution of feature values p(x|α, u) concerning an image to which the user u employs the processing α is "history/case".

However, when the function f representing $f_H(\alpha, x, u)$ is built from the case set H, it is necessary to take into account situations described below.

(1) The case set H depends on both individual users and purposes. Therefore, learning in a laboratory is impossible and online learning on site is necessary.

(2) It has to be anticipated that case and history data that can be used for learning are relatively few (several tens to a hundred). This is a condition caused by the fact that, on site, it is necessary to read a preference and a task of a user from as few data as possible and immediately adapt to the preference and the task.

(3) The feature space F is multidimensional (about 20). A "feature selection" mechanism for selecting only features suitable for prediction and removing perturbation factors or weighting to the respective feature dimensions is necessary. Even if the algorithm set A is the same, a feature subset suitable for prediction is different depending on respective algorithms α.

(4) When the image feature value x is a continuous amount, features are multidimensional, and the number of data is small, it is realistically difficult to calculate the probability distribution p(x|α, u). Because of the problem of "curse of dimension", it is difficult to estimate the probability distribution p(x|α, u) using a nonparametric Parzen window method or the EM method that assumes a mixed Gaussian distribution.

Therefore, a learning mechanism of a predictor suitable for solving the four problems described above is explained below.

One approach is to employ a nearest neighbor method as an identification method that is suitable for on-site learning and does not assume a form of a probability distribution function. The nearest neighbor method is a prediction method of using cases in the past most similar to a case presently being processed. As similar data increases, prediction accuracy is improved. The nearest neighbor method is also an identification method that does not need estimation of a probability distribution such as a Gaussian distribution. Moreover, concerning the problems of the small number of learning data and multidimensional features, the dilemma between the number of data and the number of dimensions is eliminated by weighting a distance scale in the nearest neighbor method depending on a degree of contribution to prediction of respective feature dimensions or weighting the distance scale depending on a degree of importance for each of learning data (the case set H).

As a specific method for solving the problems, the predictor building unit 26 builds a predictor using the "nearest neighbor method incorporating learning of a weighted distance". Details of the method are described in "R. Paredes & E. Vidal, "Learning weighted metrics to minimize nearest-neighbor classification error", IEEE Transactions on Pattern Analysis and Machine Intelligence, vol. 28, no. 7, pp. 1100 to 1110, July 2006". An outline of the method is described below. Among the learning data (the case set H), data used for building a predictor is called "prototype data" or "prototype point".

This method is basically a method based on the nearest neighbor method. However, in calculating a distance between a prototype point and a prediction target point, rather than a simple Euclidean distance, a weighted distance is calculated according to a degree of importance of the prototype point and degrees of importance of the respective feature dimensions.

When $x_i = (x_{i1}, \ldots, x_{id})$ represents an i-th prototype point, c represents a class of the prototype point, and $y=(y_1, \ldots, y_d)$ represents an arbitrary point of an identification target, concerning weight $v_i$ and the class c for the i-th prototype point, the square (Δ) of a distance between $x_i$ and y is defined by Expression (2) below based on weight $w_{cj}$ of a j-th feature dimension.

$$\Delta(y, x_i) = \frac{1}{v_i^2} \sum_{j=1}^{d} w_{cj}^2 (y_j - x_{ij})^2 \quad (2)$$

The number of parameters is, with respect to the number of feature dimensions d, the number of data N, and the number of classes C, N in weight of a prototype and is Cd in weight of respective dimensions determined for each of classes. In total, the number of parameters is N+Cd. "Class" refers to an element of the classification category set A, i.e., an index of an algorithm and a processing parameter applied. It is assumed that class information applied by the user is incidental to respective prototype points $x_i$.

The weight $v_i$ and the weight $w_{cj}$ are automatically learned from data. A criterion for learning is to minimize an error ratio evaluated by Leave-One-Out. Then, weight is learned by a method of steepest descent based on criteria described below.

(1) When points of the same class as the prototype point are sparsely distributed and an identification result changes when the point disappears, the weight $v_i$ takes a larger value such that the point affects a larger range (the prototype point with a high degree of importance).

(2) When points of the same class as the prototype point crowd together and a degree of influence of the presence of the prototype point on an identification result is low, learning in which the weight $v_i$ takes a smaller value is performed (the prototype point with a low degree of importance).

(3) Concerning the class c, when the influence of the j-th feature dimension on prediction is larger, the weight $w_{cj}$ takes a larger value.

(4) Concerning the class c, when the j-th feature dimension is a factor that perturbs prediction, the weight $w_{cj}$ is a value close to 0.

Leave-One-Out is a method described below. One of methods of estimating a prediction error ratio or general performance of a predictor is "cross validation". In general, an "m-fold cross validation method" includes processes described below.

(1) Learning data is divided into m subsets at random;

(2) One subset is left for evaluation and an identifier is built by using all data included in other (m−1) subsets. An error ratio is calculated in the subset for evaluation.

(3) Because there are m ways for selecting the subset for evaluation, an error ratio for unknown data is predicted according to an average of error ratios in the m ways of selection.

When m is set to the same number as the learning data, i.e., when the subset for evaluation includes one data, the method is referred to as "Leave-One-Out".

The optimum-function predicting unit 27 receives the image feature value vector output from the image-feature-value calculating unit 22 and calculates an optimum algorithm and an optimum processing parameter using the predictor built by the predictor building unit 26. In other words, the optimum-function predicting unit 27 calculates, as indicated by Expression (2), the square (Δ) of a distance between the i-th prototype point $x_i$ (a class label of which is C) and the feature value vector y calculated from the image being presently processed using the weights calculated by the predictor building unit 26, i.e., the weight $v_i$ for the i-th prototype point and the weight $w_{cj}$ in the j-th feature dimension for the class c. The optimum-function predicting unit 27 finds a prototype point where the distance is minimized and outputs a class label of the prototype point to the user I/F unit 24 as a recommended algorithm or a recommended parameter.

The user I/F unit 24 displays the recommended algorithm or the recommended parameter output from the optimum-function predicting unit 27 on the display device 11 or the like to thereby present the same to the user. The user can input an indication whether the user likes or does not like the recommendation using the keyboard 12, the pointing device 13, or the like. If the user does not like the recommendation, the user can input processing and parameters again using the keyboard 12, the pointing device 13, or the like. A result of response of the user is output to the case database 23 and the prototype-data updating unit 25.

An object of the embodiments is to improve efficiency of work by predicting and recommending processing desired by the user quickly in adaptation to a purpose of use of the user that dynamically changes. To realize the object, a mechanism (online learning) for updating a predicting mechanism according to a latest situation every time a new case is offered. In the existing predicting mechanism, because the update (learning) takes a certain degree of time, the predicting mechanism is updated (batch learning) in time when a system is idle after a series of work is finished.

Therefore, the predictor building unit 26 includes the online learning unit 26a and the batch learning unit 26b as a core technology for realizing "adaptation to a purpose of use that dynamically changes according to a situation". As shown in Table 2 below, "batch learning" and "online learning" are complementary in advantages and disadvantages A normal learning mechanism is the "batch learning". The "online learning" is necessary to supplement disadvantages of the "batch learning".

TABLE 2

|  | Batch learning | Online learning |
| --- | --- | --- |
| Frequency | Start at a stage when new data is sufficiently stored | Start every time new data (one) is input |
| Necessary data amount | Perform learning using all data | Perform learning using only new data (one) and data near the new data |
| Prediction accuracy | High | Inferior to batch learning |
| Calculation time | Long (a degree that forces a user to suspend work). Specific order is different depending on an algorithm and a quality and an amount of data | Short (a degree that the user does not notice or that does not hinder work) |
| Dynamic change adaptability | Unless learning is performed again, latest situation is not reflected on the predicting mechanism during work of the user. A predicting mechanism is updated by performing learning in idle time after finish of work | Even during work of the user, a latest situation can be always reflected on the predicting mechanism. The predicting mechanism is updated every time new data is input |

An algorithm of the online learning is explained below. The online learning is started every time prediction for input new (one) data is wrong. Only the input new data and prototype data near the input new data are used. An input and an output of the algorithm are as described below.

Input: prototype data set $T_0$ ($T_0 = (x_i, y_i)$: $x_i$ is a feature value vector and $y_i$ is a selected case) used for building a present predictor, weight $P_0$ of a distance used in the present predictor, and input new case data ($x_0, y_0$)

Output: Updated prototype data $T_0$ and updated weight $P_0$ of distance

Calculation of a distance is performed as indicated by Expression (2) by using the weight $P_0$ of the distance used in the present predictor.

The algorithm of the online learning includes two steps, i.e., update of a prototype data set by the prototype-data updating unit 25 and building and update of a predictor by the online learning unit 26a of the predictor building unit 26.

First, update of the prototype data set $T_0$ used in the predictor is explained below.

Basically, the prototype-data updating unit 25 calculates a union of the input new case data $(x_0, y_0)$ and the prototype data set $T_0$ in the past and updates the prototype data set $T_0$ used for building the predictor. If "data representing a different purpose of use" that is substantially the same as the new data $x_0$ but has a different selected case is present in $T_0$, such data is excluded from $T_0$. A method of excluding the data is as described below.

(1) Concerning the new data $x_0$, closest data in elements of $T_0$ is represented as (x', y'). Because prediction concerning the new data $x_0$ is wrong, $y_0 \neq y'$.

$$x' = \arg\min_{z}\{\Delta(x_0, z): z \in T_0\} \quad (3)$$

(2) Concerning x', closest data (x", y") in elements of $T_0 - \{(x', y')\}$ is found.

$$x'' = \arg\min_{z}\{\Delta(x', z): z \in T_0 - \{(x', y')\}\} \quad (4)$$

(3) If $x_0$ and x' are nearest to each other, i.e.

$$\Delta(y_0, x') < \Delta(x', x'') \quad (5)$$

$T_0$ is updated as $T_0 \leftarrow T_0 \cup \{(x_0, y_0)\} - \{(x', y')\}$.
Otherwise, $T_0$ is updated as $T_0 \leftarrow T_0 \cup \{(x_0, y_0)\}$.

Figure 9:
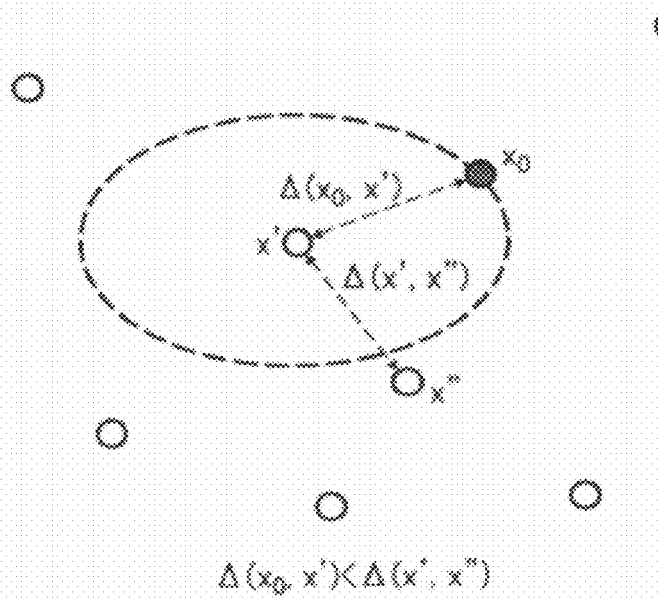
FIG. 9 is a schematic diagram of removal of old prototype data x'.
Figure 10:
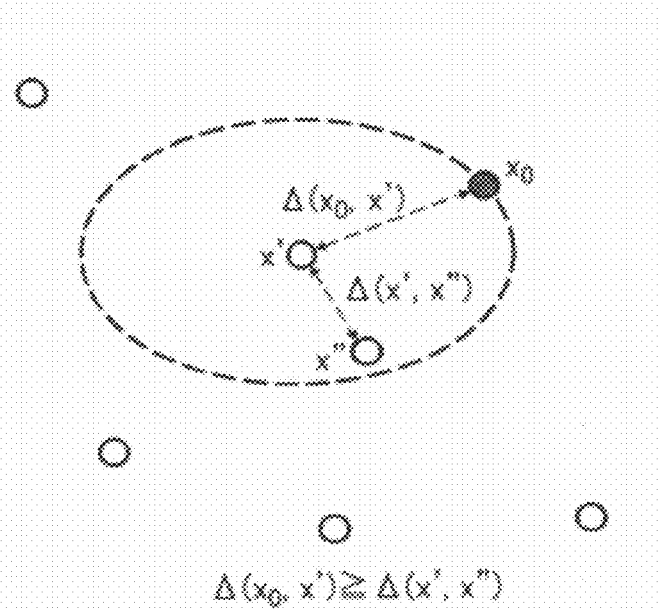
FIG. 10 is a schematic diagram of maintenance of the old prototype data x'.

FIG. 9 is a diagram of removal of old prototype data x'. FIG. 10 is a diagram of maintenance of the old prototype data x'. In FIGS. 9 and 10, an ultra elliptical spherical surface that has the old prototype data x' in the center and passes through $x_0$.

As shown in FIG. 9, other data is not present in the ultra elliptical sphere, the data x' is excluded from the prototype data. On the other hand, as shown in FIG. 10, when other data is present in the ultra elliptical sphere, the data x' remains as prototype data.

As shown in FIGS. 9 and 10, because of the weighted distant indicated by Expression (2), in general, points present at an equal distance from certain data form an ultra elliptical sphere. A shape of the ultra elliptical sphere is different depending on a class to which the data belongs. A scale factor is different depending on a prototype point.

Building and update of a predictor by the online learning unit 26a of the predictor building unit 26 are explained below. Specifically, extraction of a near data group N ($x_0$) of the new data ($x_0$, $y_0$) and update of weight of prototype data are explained.

First, a close data group of $x_0$ is extracted from data of the prototype data set $T_0$. To extract the near data group, it is sufficient to determine the number ne (e.g., 20) of near data, calculate $\Delta(x_0, z)$ for respective elements z of the prototype data set $T_0$, and select ne data in ascending order of $\Delta(x_0, z)$. A near data group N($x_0$) is a set including the ne data selected from the prototype data set $T_0$ and new $x_0$.

Concerning the data group N($x_0$), only the weight $v_i$ of the prototype data is updated. For calculation of the weight $w_{cj}$ of a feature dimension, all prototype data belonging to the class c are necessary. Therefore, the weight $w_{cj}$ used in the present predictor is not changed. Concerning the new data $x_0$, an initial value of weight is set to 1.

The weight of the prototype data is updated during the online learning. Therefore, even if the data $x_0$ is the same, it is likely that the near data group N($x_0$) calculated at the Step by the online learning unit 26a is different every time. Therefore, it should be noted that, even at the Step by the prototype-data updating unit 25, it is likely that different prototype data is deleted every time.

In the learning method, as described above, the iterative calculation by the method of steepest descent is performed, with a value of the weight $v_i$ of the present prototype data set as an initial value, until an error ratio evaluated by Leave-One-Out decreases to a minimum value. However, there are few data used for learning and a parameter to be calculated is only the weight of the prototype data. Therefore, calculation time is far shorter. For example, if ne is about 20, the calculation time is so short that the user does not notice the calculation time or work is not hindered.

The batch learning by the batch learning unit 26b performed by the online learning unit 26a after the online learning is described below. The batch learning is necessary because of two reasons described below.

(1) Change in Weight of a Feature Dimension

During the online learning, when addition and deletion of prototype data are performed in adaptation to a change of a purpose, simultaneously, degrees of importance for prediction of respective feature dimensions concerning the respective classes (c) change. Therefore, after the online learning, it is necessary to calculate, with the batch learning, the weight parameter $w_{cj}$ concerning a feature dimension (j) from the entire prototype data. In the online learning, local processing for new data and data near the new data is performed. Therefore, weights of feature dimensions for the respective classes cannot be calculated. However, concerning weights of prototypes, local calculation in the vicinity in which the weights affect one another is possible.

(2) Incompleteness of Prototype Data Formed by Local and Temporary Processing

The addition and deletion of the prototype data performed during the online learning are performed based on local and temporary judgment criteria. Therefore, it is likely that a case that can be correctly predicted so far is incorrectly predicted because of the addition and deletion of the prototype data. To supplement the prototype data set obtained by the online learning, it is necessary to add a case not included in the prototype data or delete a case included in the prototype data. For the addition or deletion, batch processing for adjusting prototype data used for the predictor using all recent case data is necessary.

Figure 11:
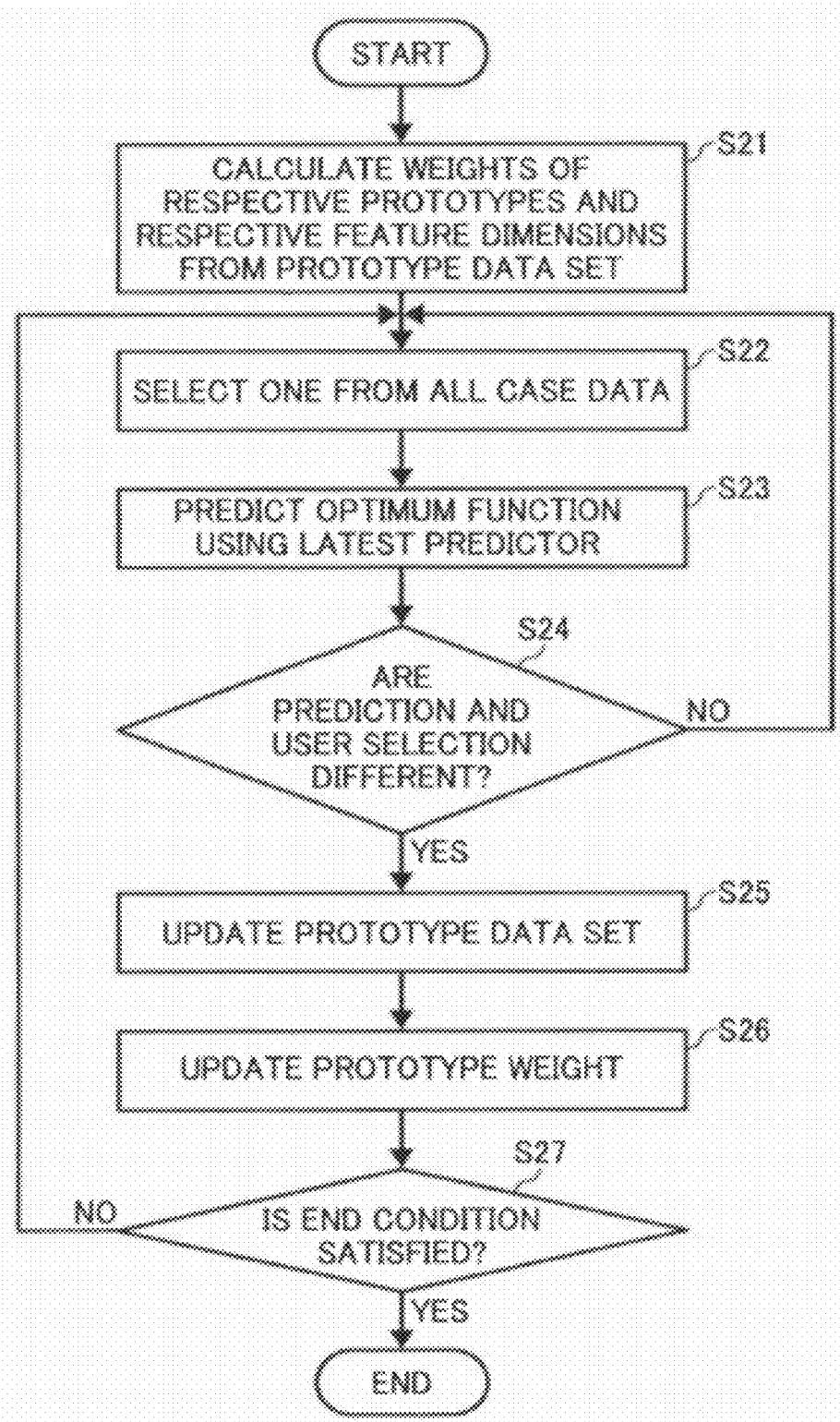
FIG. 11 is a flowchart of a processing procedure of batch learning.

A procedure of the batch learning is explained below. The batch learning includes processing corresponding to the two objects described above. The procedure of the batch learning is shown in FIG. 11.

The batch learning unit 26b calculates weights of the respective prototypes and the respective feature dimensions from the prototype data set (Step S21).

Subsequently, the batch learning unit 26b selects a case ($x_0$, $y_0$) from all recent case data (Step S22) and predicts an optimum function using a latest predictor (Step S23). Specifically, the batch learning unit 26b learns weights of feature dimensions and prototypes in a "weighted distance of the nearest neighbor method" from the prototype data set built in the "online learning", and builds a predictor. As described above, the iterative calculation by the method of steepest descent is performed, with present values of $v_i$ and $w_{cj}$ set as initial values, until an error ratio evaluated by Leave-One-Out decreases to a minimum value. Because of the iterative calculation by the method of steepest descent, it is difficult to adjust a learning coefficient and, depending on an initial value and setting of a learning coefficient, different local optimum solutions are obtained. Therefore, the initial value and the learning coefficient are determined by a method described below.

All the weights $v_i$ of prototype points are initialized to 1.

The weights $w_{cj}$ of the j-th dimension of the class c is set as follows. An error ratio at the time when all weights $w_{cj}$ are set to 1.0 (a normal Euclidean distance) and an error ratio at the time when $w_{cj}$ is set to the inverse of a standard deviation of a distribution of the j-th feature value (a Mahalanobis distance) are calculated. An initial value is set to $w_{cj}$ with a smaller error ratio.

Concerning the learning coefficient, results obtained by calculating, with the number of times of iteration limited, error ratios by setting the learning coefficient to several values are compared. A value of the learning coefficient with a smallest error ratio is adopted. The iterative calculation is performed until the weights $v_i$ and $w_{cj}$ converge.

At the subsequent Step S24, the batch learning unit 26b compares the optimum function predicted by using the latest predictor at Step S23 and an actual user selection.

When the predicted optimum function and the actual user selection are not different (NO at Step S204), process control returns to Step S22 and selects the next case $(x_0, y_0)$.

On the other hand, when the predicted optimum function and the actual user selection are different (YES at Step S24), the batch learning unit 26b performs supplementary processing for the prototype data in processing after Step S24. The batch learning unit 26b reduces the prototype data set to be as small as possible and optimizes prototype weight to set prediction accuracy high. For this purpose, the batch learning unit 26b repeats the addition and removal of the prototype data and the update of the prototype weight performed in the online learning.

First, at Step S25, the batch learning unit 26b executes update processing for a set of prototype data. Specifically, the batch learning unit 26b adds the case $(x_0, y_0)$ to the prototype set and deletes contradictory data from the present prototype data set. A method for this is the same as the update of the prototype data set by the prototype-data updating unit 25.

At the subsequent Step S26, the batch learning unit 26b executes update processing for prototype weight for near data of $x_0$. Specifically, like the online learning unit 26a of the predictor building unit 26, the batch learning unit 26b extracts near data group $N(x_0)$ of the case data $(x_0, y_0)$ and updates the weight of prototype data for $N(x_0)$. Because the weight of the prototype data is updated every time, in the distance calculated by Expression (2), scale factors of the respective data change every time the weight is updated. Even if the data $x_0$ is the same, it is likely that the near data group $N(x_0)$ is different every time. Therefore, at Step S25, it should be noted that it is likely that different prototype data are deleted.

The processing at Steps S23 to S26 explained above is repeated until an end condition is satisfied (YES at Step S27).

The selection of a case at Step S22 is performed in time series order or at random. The end condition can be, for example, that the processing is repeated for all case data several times or an error ratio falls to be lower than a threshold. For example, the case selection is performed at random and the end condition is that the processing is repeated for all the case data for three times.

As described above, according to the first embodiment, when processing depending on "purpose" of an individual user is performed on an image, a function for predicting a function optimum for various images is automatically learned based on image feature values of images processed so far and functions (algorithms and processing parameters) employed by the user. A function optimum for an image being processed at present is predicted and recommended to the user. Therefore, the user can obtain a desired image with a little operation (selection from a menu and parameter setting). This makes it possible to, when processing based on "purpose" of the individual user is performed on a large quantity of images, realize improvement of work efficiency without imposing a burden on user operation while taking into account the "purpose" of the individual user. Every time a case set is updated, a latest situation is reflected on the predictor during work by the user by rebuilding a predictor using the case set. This makes it possible to automatically update a method of prediction according to a change of a purpose of the user.

Furthermore, the system becomes more intelligent through the online learning even during work by the user and it is possible to keep high prediction accuracy by starting the batch learning in idle time after work is finished.

A second embodiment of the present invention is explained below with reference to FIGS. 12 to 15. Components same as those in the first embodiment are denoted by the same reference numerals and signs and explanation of the components is not repeated.

Figure 12:
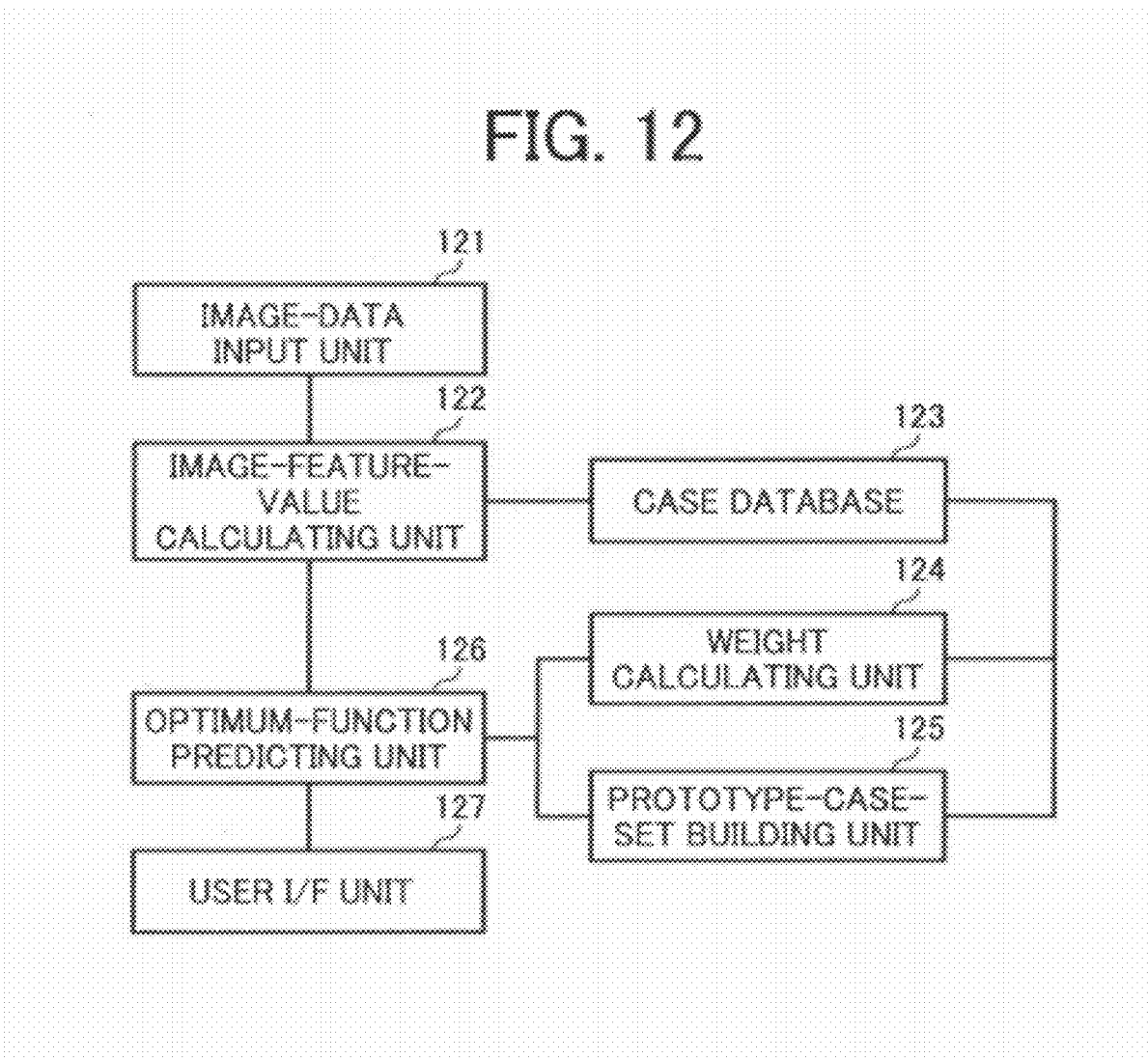
FIG. 12 is a functional block diagram of image processing functions of a data processing apparatus according to a second embodiment of the present invention.
Figure 13:
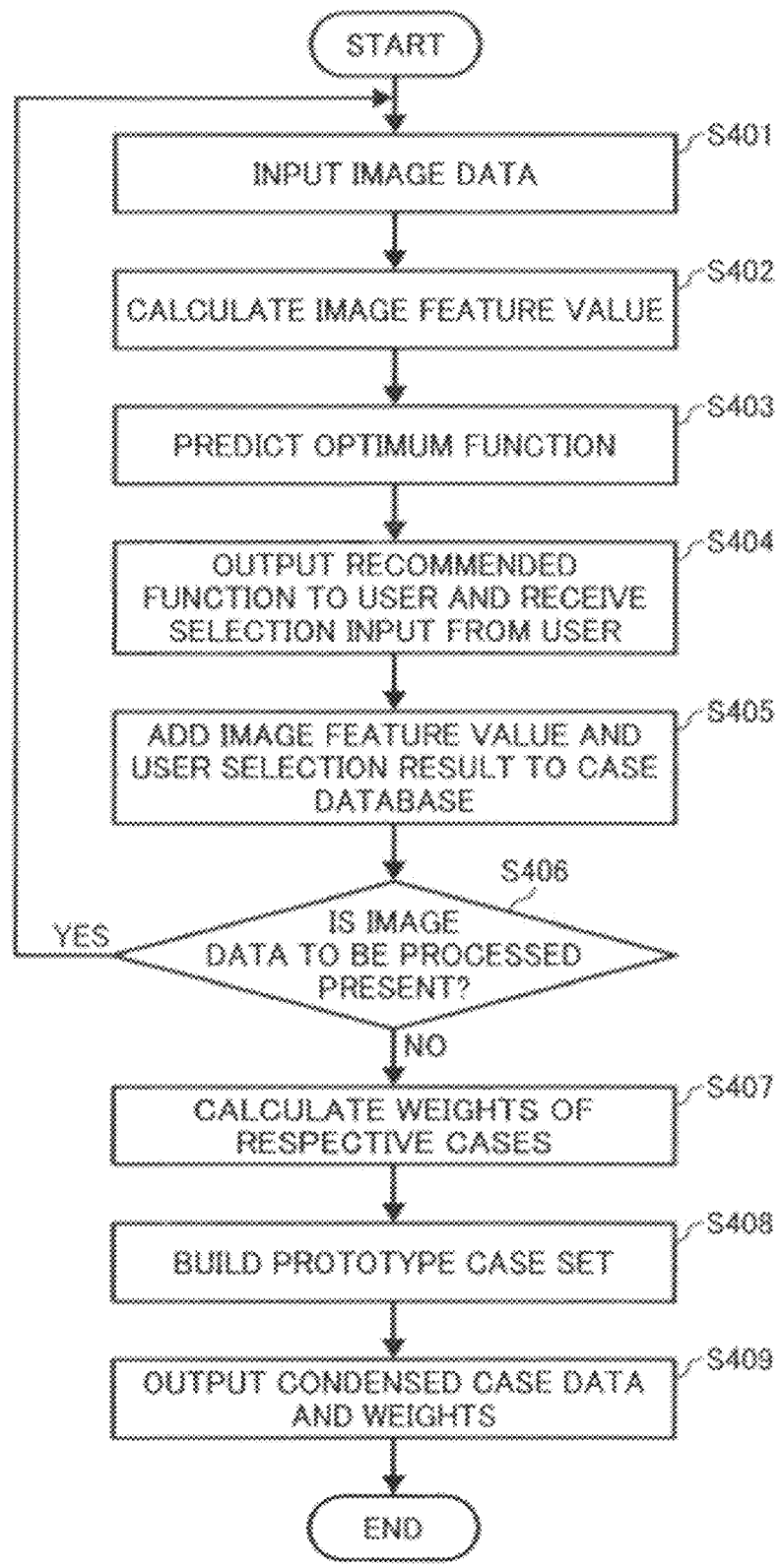
FIG. 13 is a flowchart of a processing procedure of image processing.

FIG. 12 is a functional block diagram of functions for image processing executed by the CPU 2 of the data processing apparatus 1 according to the second embodiment. FIG. 13 is a flowchart of a processing procedure of the image processing.

As shown in FIG. 12, the data processing apparatus 1 includes an image-data input unit 121, an image-feature-value calculating unit 122 that functions as feature-value calculating means for calculating image feature values for respective image data, a case database 123 that stores therein cases (algorithms and processing parameters), a weight calculating unit 124 that functions as weight calculating means for calculating weights of the respective cases stored in the case database 123, a prototype-case-set building unit 125 that functions as case-set building means for executing prototype condensing and building a prototype case set, an optimum-function predicting unit 126 that functions as optimum-function predicting means, and a user I/F unit 127 that functions as input receiving means for receiving an input from the user and returning an output to the user.

As shown in FIG. 13, the image-data input unit 121 inputs unknown image data (Step S401). The image-feature-value calculating unit 122 calculates an image feature value from the image data output from the image-data input unit 121 (Step S402). The optimum-function predicting unit 126 predicts an optimum function using weight calculated by the weight calculating unit 124 and a prototype case set built by the prototype-case-set building unit 125 (Step S403).

Thereafter, the user I/F unit 127 presents the optimum function, which is output from the optimum-function predicting unit 126, to the user by displaying the optimum function on a screen or the like of the display device 11 as a recommended function and receives a selection input for a function from the user (Step S404).

The CPU 2 adds the image feature value calculated by the image-feature-value calculating unit 122 and a result of the user selection received by the user I/F unit 127 to the case database 123 (Step S405).

The processing at Steps S401 to S405 described above is repeated until it is judged that there is no image data to be processed (YES at Step S406).

When it is judged that there is no image data to be processed (YES at Step S406), the weight calculating unit 124 calculates weights of the respective cases (Step S407). The prototype-case-set building unit 125 builds a prototype case set (Step S408). The CPU 2 outputs condensed case data and the weights (Step S409).

Operations and actions of the respective units are explained in detail below.

If input image data is scanned document image data, the image-data input unit 121 performs pre-processing on the document image data, for example, performs "skew correction" for correcting a tilt of a document on the document image data.

The image-feature-value calculating unit 122 receives the document image data output from the image-data input unit 121 and outputs a feature value representing document content to the case database 123 and the optimum-function predicting unit 126.

The image feature value can be formed as combination of a vector obtained based on frequencies of "Bag-Of-Words", i.e., words present in a document, and a vector obtained based on feature values of document images disclosed in, for example, Japanese Patent No. 3253356 and Japanese Patent No. 3215163. As an example, a method of calculating a continuous feature value vector representing a layout feature of a document is explained below.

Image feature value calculation processing in the image-feature-value calculating unit 122 is the same as the image feature value calculation processing in the image-feature-value calculating unit 22 according to the first embodiment. Therefore, explanation of the image feature value calculation processing is not repeated.

The case database 123 is a database that receives the image feature value output from the image-feature-value calculating unit 122 and a selection by the user and output from the user I/F unit 127, and accumulates the image feature value and the selection as a case set H, which is learning data described below.

$$H=\{(x(1), \alpha(i)), (x(2), \alpha(2)), \ldots \}$$

$x(k)$: an image feature value extracted from a j-th image $\alpha(k)$: an algorithm and a processing parameter suitable for the image A method of calculating weight by the weight calculating unit 124 is explained below. As the method of calculating weight, the nearest neighbor method can be employed, which is an identification method that is suitable for identification based on a case and does not assume a form of a probability distribution function. The nearest neighbor method is a prediction method of using cases in the past most similar to a case presently being processed. As similar data increases, prediction accuracy is improved. The nearest neighbor method is also an identification method that does not need estimation of a probability distribution such as a Gaussian distribution. Moreover, concerning the problems of the small number of learning data and multidimensional features, the dilemma between the number of data and the number of dimensions is eliminated by weighting a distance scale in the nearest neighbor method depending on a degree of contribution to prediction of respective feature dimensions or weighting the distance scale depending on a degree of importance for each of learning data (the cases).

In the second embodiment, as a specific method for solving the problems, the "nearest neighbor method incorporating learning of a weighted distance" is used. Details of the method are described in "R. Paredes & E. Vidal, "Learning weighted metrics to minimize nearest-neighbor classification error", IEEE Transactions on Pattern Analysis and Machine Intelligence, vol. 28, no. 7, pp. 1100 to 1110, July 2006". An outline of the method is described below.

This method is basically a method based on the nearest neighbor method. However, in calculating a distance between a prototype point and a prediction target point, rather than a simple Euclidean distance, a weighted distance is calculated according to a degree of importance of the prototype point and degrees of importance of the respective feature dimensions.

When $x_i=(x_{i1}, \ldots, x_{id})$ represents an i-th prototype point, c represents a class of the prototype point, and $y=(y_1, \ldots, y_d)$ represents an arbitrary point of an identification target, concerning weight $v_i$ and the class c for the i-th prototype point, the square ($\Delta$) of a distance between $x_i$ and y is defined by Expression 6 below based on weight $w_{cj}$ of a j-th feature dimension.

$$\Delta(y, x_i) = \frac{1}{V_i^2} \sum_{j=1}^{d} w_{cj}^2 (y_j - x_{ij})^2 \qquad (6)$$

The number of parameters is, with respect to the number of feature dimensions d, the number of data N, and the number of classes C, N in weight of a prototype and is Cd in weight of respective dimensions determined for each of classes. In total, the number of parameters is N+Cd. "Class" refers to an element of the set A, i.e., an index of an algorithm and a processing parameter applied. It is assumed that class information applied by the user is incidental to respective prototype points $x_i$.

The weight $v_i$ and the weight $w_{cj}$ are automatically learned from data. A criterion for learning is to minimize an error ratio evaluated by Leave-One-Out. Then, weight is learned by the method of steepest descent according to criteria described below.

(1) When points of the same class as the class are sparsely distributed and an identification result changes when the point disappears, the weight $v_i$ takes a larger value such that the point affects a larger range (the prototype point with a high degree of importance).

(2) When points of the same class as the case crowd together and a degree of influence of the presence of the case on an identification result is low, learning in which the weight $v_i$ takes a smaller value is performed (the case with a low degree of importance).

(3) Concerning the class c, when the influence of the j-th feature dimension on prediction is larger, the weight $w_{cj}$ takes a larger value.

(4) Concerning the class c, when the j-th feature dimension is a factor that perturbs prediction, the weight $w_{cj}$ is a value close to 0.

Figure 14:
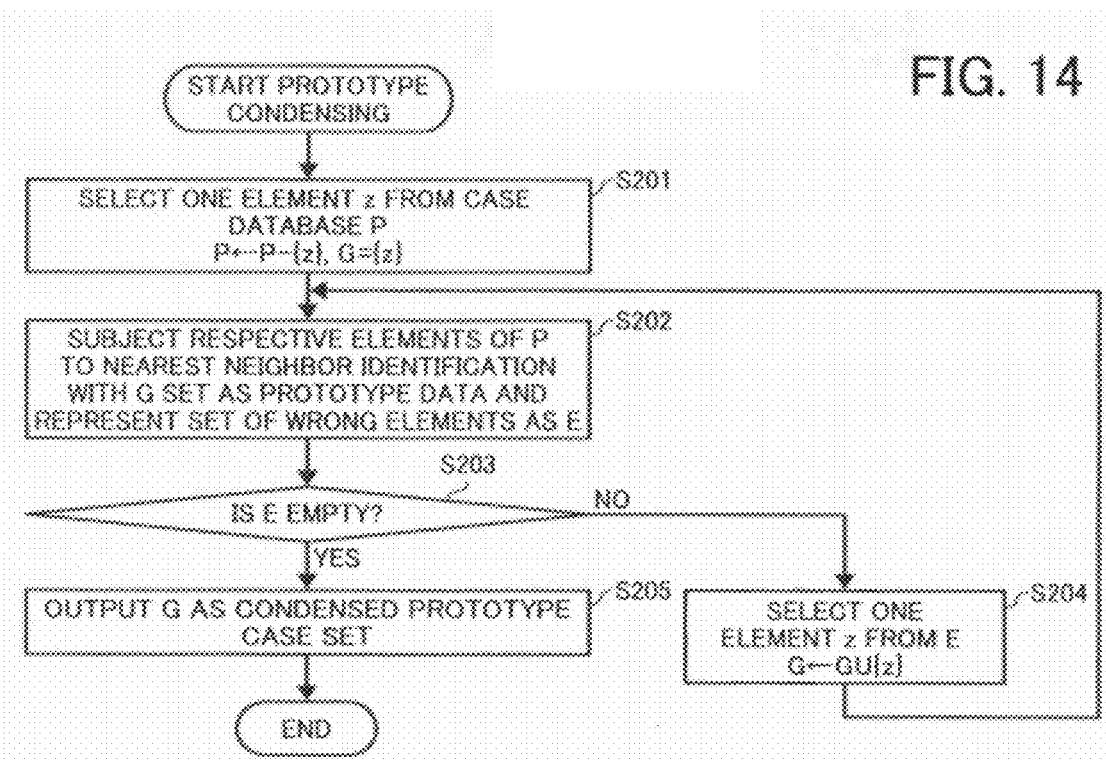
FIG. 14 is a flowchart of a processing procedure of prototype condensing processing.

The prototype-case-set building unit 125 that executes the prototype condensing is explained below. The prototype condensing means reduces the number of cases without substantially deteriorates identification performance in nearest neighbor identification. In general, a basic algorithm of the prototype condensing is a simple algorithm as shown in FIG. 14. The algorithm shown in FIG. 14 receives an original case database P and selects one element z from the case database P (Step S201). The algorithm subjects respective elements of the case database P to nearest neighbor identification with G set as prototype data and represents a set of wrong elements as E (Step S202). When E is not empty (NO at Step S203), the algorithm selects one element z from E (Step S204) and repeats the processing at Step S202. On the other hand, when E is empty (YES at Step S203), the algorithm outputs G as a condensed prototype case set (a prototype case set G including only a part of the prototype case set) (Step S205) and process control ends. When the original case database P is subjected to nearest neighbor identification by using the condensed prototype case set G obtained by the algorithm, the case database P is correctly identified at accuracy of 100%. Such a set G is referred to as minimal consistent set (MCS).

A "method of selecting the element z" for sequentially adding cases to the prototype case set G poses a problem. In the prototype condensing, it is desirable to select cases to form an MCS as small as possible. However, the algorithm shown in FIG. 14 depends on ordering of cases.

Figure 15:
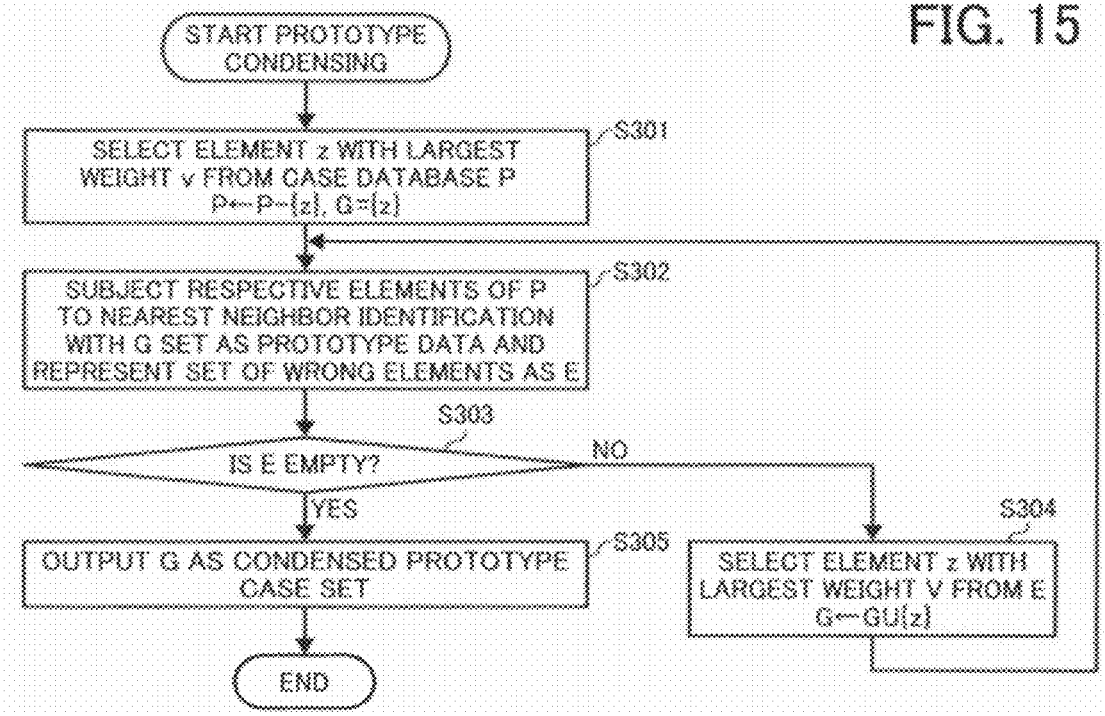
FIG. 15 is a flowchart of a processing procedure of prototype condensing processing employing "weights of cases"

Therefore, in the second embodiment, the algorithm selects the element z using the "weighs of the respective cases" calculated by the weight calculating unit 124. "Weight of a case" reflects a degree of importance of the case in a sense described above. Because a case with large weight v has a large power range, it is natural to consider that a degree of importance of the case is high. An algorithm of prototype condensing that uses weight of a case is shown in FIG. 15. The algorithm shown in FIG. 15 receives an original case database P and selects one element z with the largest weight v from the case database P (Step S301). The algorithm subjects respective elements of the case database P to nearest neighbor identification with G set as prototype data and represents a set of wrong elements as E (Step S302). When E is not empty (NO at Step S303), the algorithm selects one element z from E (Step S304) and repeats the processing at Step S302. On the other hand, when E is empty (YES at Step S303), the algorithm outputs G as a condensed prototype case set (a prototype case set G including only a part of the prototype case set) (Step S305) and process control ends.

The optimum-function predicting unit 126 receives the image feature value vector output from the image-feature-value calculating unit 122 and calculates an optimum algorithm and an optimum processing parameter using the prototype case set built by the prototype-case-set building unit 125 and the weights calculated by the weight calculating unit 124. The optimum-function predicting unit 126 calculates, as indicated by Expression 2, the square ($\Delta$) of a distance between the i-th prototype case $x_i$ (a class label of which is C) in the prototype case set and the feature value vector y calculated from the image being presently processed using the weight calculated by the weight calculating unit 124, i.e., the weight $v_i$ for the i-th prototype point and the weight $w_{cj}$ in the j-th feature dimension for the class c. The optimum-function predicting unit 126 finds a prototype point where the distance is minimized and outputs a class label of the prototype point to the user I/F unit 127 as a recommended algorithm or a recommended parameter.

The user I/F unit 127 displays the recommended algorithm or the recommended parameter output from the optimum-function predicting unit 126 on the display device 11 or the like to thereby present the same to the user. The user can input an indication whether the user likes or does not like the recommendation using the keyboard 12, the pointing device 13, or the like. If the user does not like the recommendation, the user can input processing and parameters again using the keyboard 12, the pointing device 13, or the like. A result of response of the user is output to the case database 123 and the prototype-case-set building unit 125.

As described above, according to the second embodiment, when processing depending on "preference" of an individual user is performed on an image, a function for predicting a case optimum for various images is automatically learned based on image feature values of images processed so far and cases (algorithms and processing parameters) employed by the user. A case optimum for new image data is predicted and recommended to the user. Therefore, the user can obtain a desired image with little operation (selection from a menu and parameter setting). This makes it possible to, when processing based on "preference" of the individual user is performed on a large quantity of images, realize improvement of work efficiency without imposing a burden on user operation while taking into account the "preference" of the individual user. In long-term operation of the system on site, it is possible to keep calculation time required for prediction online, the number of case data (prototype data) stored by the prototype case set, time required for learning performed in idle time, and the like substantially fixed.

The prototype-case-set building unit 125 selects only one case having the maximum degree of importance from the case database 123 as an element of an initial prototype case set in order. However, the present invention is not limited to this. For example, a case with a maximum degree of importance can be selected for each of C classes to form the initial prototype case set with elements of C cases. This makes it possible to preferentially add a case with a high degree of importance to the prototype case set. Therefore, it is possible to build a smaller prototype case set compared with a prototype case set to which cases are added at random.

In the second embodiment, in the batch learning, weights of respective cases are calculated in the weight calculating unit 124, a prototype case set is built by the prototype-case-set building unit 125, and condensed case data and the weights are output. However, the same processing can be performed in the online learning.

A third embodiment of the present invention is explained below with reference to FIGS. 16 to 21. Components same as those in the first or the second embodiment are denoted by the same reference numerals and signs and explanation of the components is not repeated.

Figure 16:
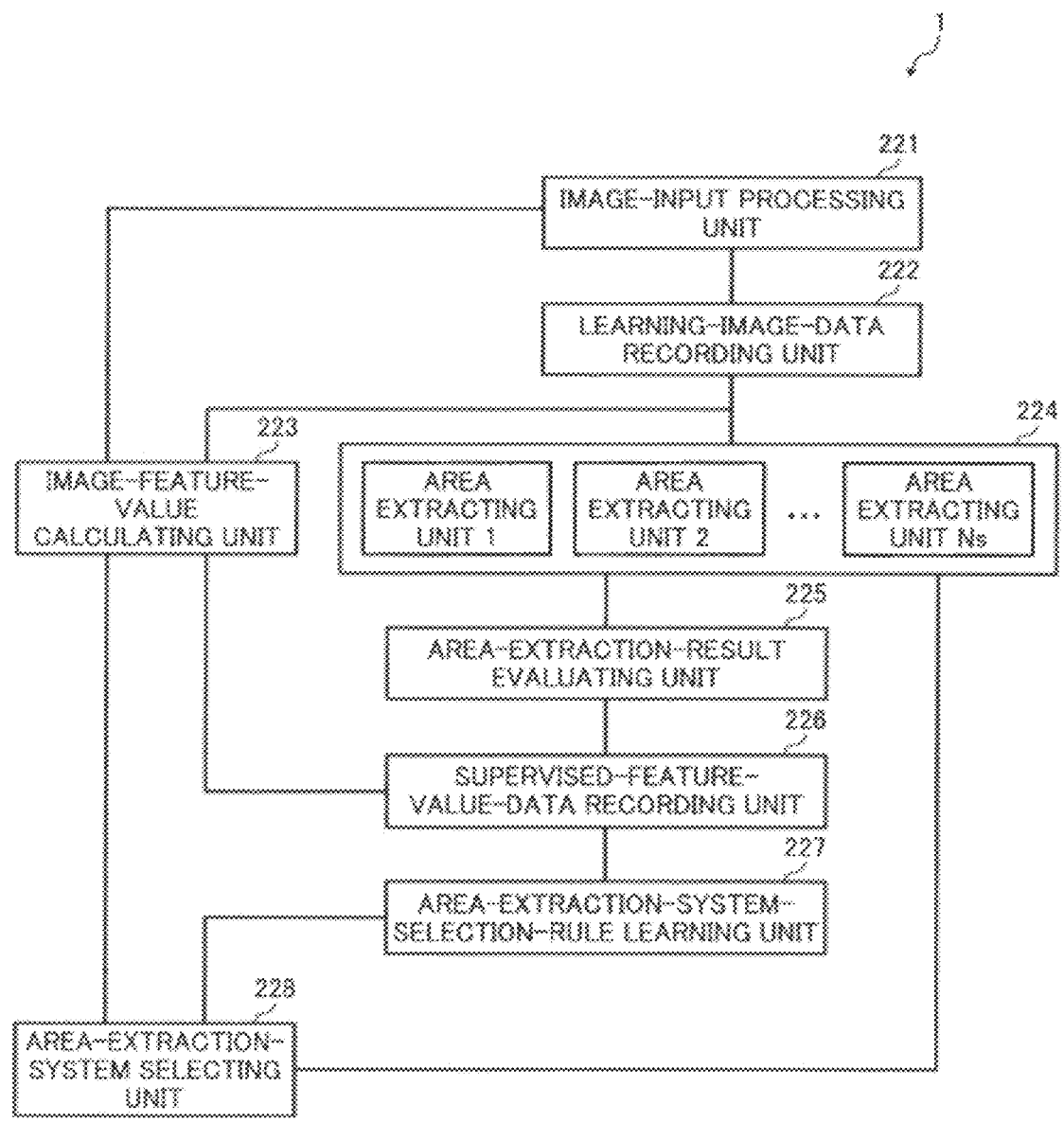
FIG. 16 is a functional block diagram of image processing functions of a data processing apparatus according to a third embodiment of the present invention.
Figure 17:
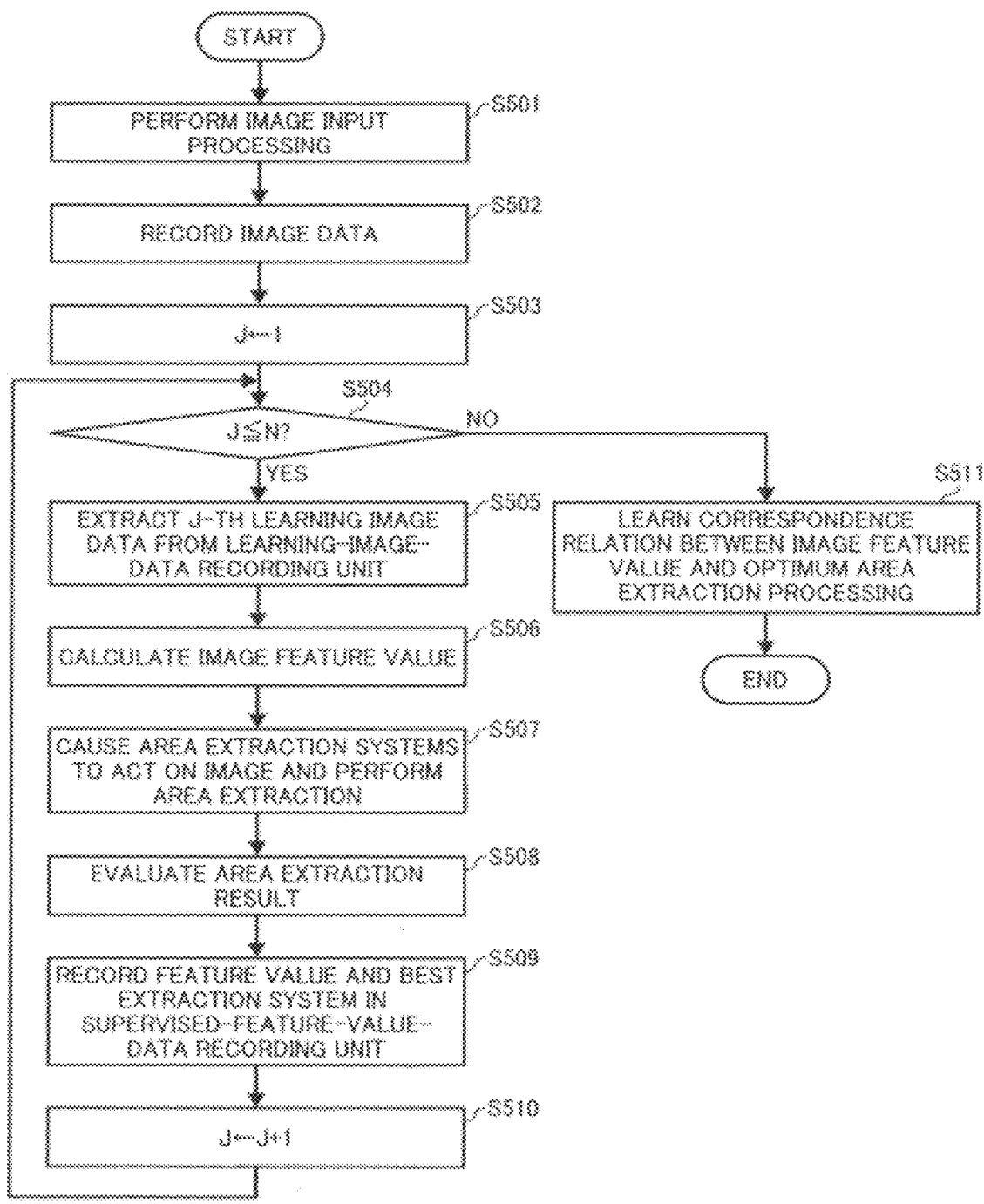
FIG. 17 is a schematic flowchart of a flow of image processing.

FIG. 16 is a functional block diagram of functions for image processing executed by the CPU 2 of the data processing apparatus 1 according to the third embodiment. FIG. 17 is a flowchart of a processing procedure of the image processing.

As shown in FIG. 16, the data processing apparatus 1 includes an image-input processing unit 221, a learning-image-data recording unit 222, an image-feature-value calculating unit 223 that functions as feature-value calculating means, area extracting units 224 that function as area extracting means, an area-extraction-result evaluating unit 225 that functions as evaluating means, a supervised-feature-value-data recording unit 226 that functions as feature-value-data recording means, an area-extraction-system-selection-rule learning unit 227 that functions as learning means, and an area-extraction-system selecting unit 228 that functions as selecting means. Operations and actions of the respective units are explained in detail below.

The image-input processing unit 221 performs pre-processing on an input document image, for example, performs "skew correction" for correcting a tilt of a document in the document image on the document image or, in the case of a color input, converts the document image into a gray scale image of monochrome to generate image data (Step S501 shown in FIG. 17).

The learning-image-data recording unit 222 records the image data subjected to the pre-processing by the image-input processing unit 221 in a predetermined area of the HDD 6 to use the image data for learning of area extraction system selection rules described later (Step S502 shown in FIG. 17).

N image data recorded in the learning-image-data recording unit 222 are extracted one by one as shown in FIG. 17

(Steps S503, S504, S505, and S510) and subjected to processing at the following Steps.

Image feature value calculation processing in the image-feature-value calculating unit 223 is the same as the image feature value calculation processing in the image-feature-value calculating unit 22 according to the first embodiment. Therefore, explanation of the image feature value calculation processing is not repeated.

Figure 18A:
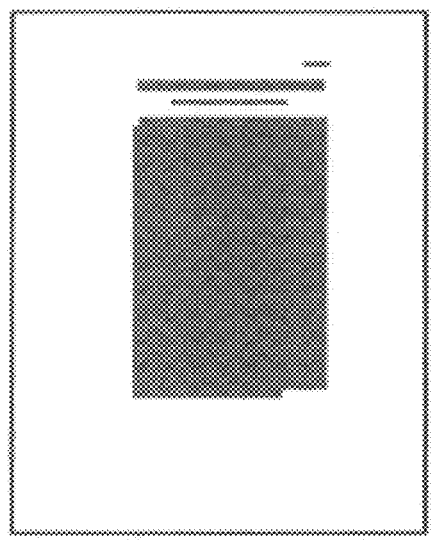
FIGS. 18A and 18B are schematic diagrams of results of area extraction from images shown in FIG. 8B.
Figure 18B:
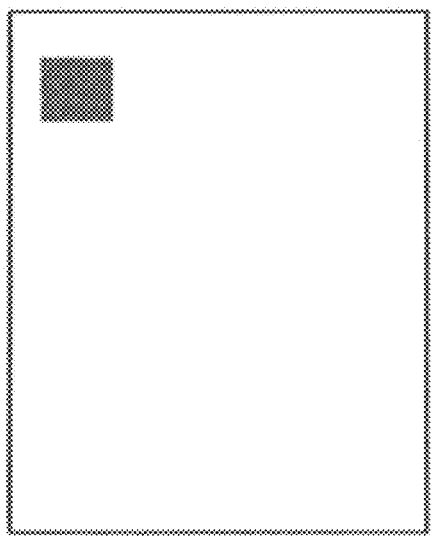
Figure 19A:
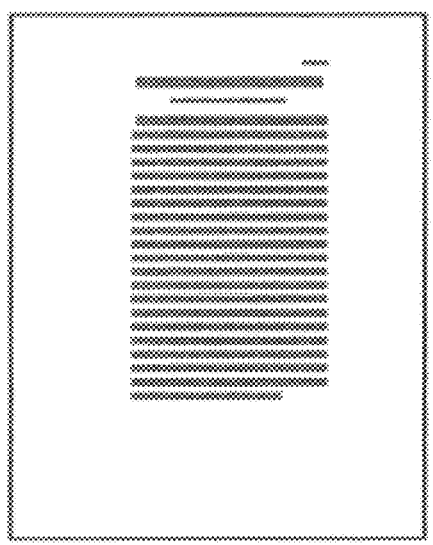
FIGS. 19A and 19B are schematic diagrams of results of area extraction from images shown in FIG. 8B.
Figure 19B:
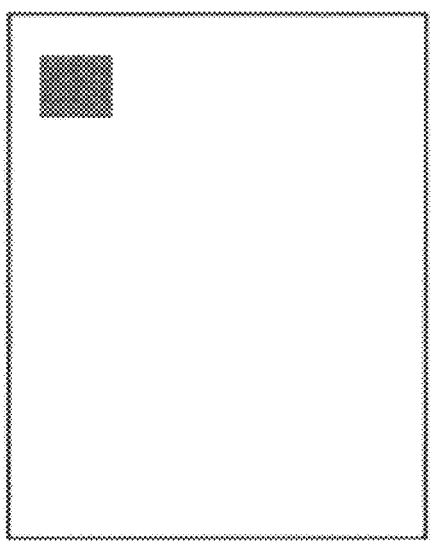

The area extracting units 224 are explained below. In the third embodiment, the area extracting units 224 of two or more area extracting systems, in which a plurality of different systems are set or, even if a system is the same, a plurality of parameters are set, are caused to act on image data as a processing object to perform area extraction (Step S507 shown in FIG. 17). In other words, as shown in FIG. 16, Ns (Ns is two or more) of the area extracting units 224 are arranged. As described in connection with the conventional technologies, a plurality of systems for area extraction is known. Different results are obtained for an identical image with different systems. For example, FIGS. 18A and 18B are diagrams of results of area extraction from images shown in FIG. 8B. FIG. 18A is an area extraction result for a character area by a layout analysis method according to a top-down type area extraction system disclosed in, for example, Japanese Patent Application Laid-open No. 2006-085665. FIG. 18B is an extraction result for a photograph area. When methods disclosed in Japanese Patent Application Laid-open No. 2000-067158 and Japanese Patent Application Laid-open No. 2000-113103 are applied, as shown in FIG. 19A, a result different from that shown in FIG. 18A is obtained.

The area-extraction-result evaluating unit 225 evaluates output results of the area extracting units 224 of the area extraction systems (Step S508 shown in FIG. 17). More specifically, the area-extraction-result evaluating unit 225 collates the output results of the area extracting units 224 of the area extraction systems with a correct answer of an extracted area prepared for each of learning image data to thereby calculate a difference between the correct answer and each of the outputs and ranks the area identification systems caused to act on the image data. FIGS. 20A and 20B are diagrams of examples of the correct answer prepared as results of the area extraction from images shown in FIG. 8B. Differences between the example of the correct answer shown in FIGS. 20A and 20B and the output results of the area extraction systems shown in FIGS. 18A, 18B, 19A and 19B are calculated. There is a known method for the calculation of the differences. For example, in the document 'J. Liang, I. T. Phillipps, and R. M. Haralick, "Performance evaluation of document structure extraction algorithms," Computer Vision and Image Understanding, vol. 84, pp. 144 to 159, 2001', a method based on the number of times of merging and partitioning of areas necessary for converting an output result into a correct answer is described. For example, in the area extraction result shown in FIGS. 19A and 19B, the character area is finely partitioned. Therefore, the order is lower than the area extraction result shown in FIGS. 18A and 18B.

The supervised-feature-value-data recording unit 226 records, as supervised feature value data, image feature values of the respective learning image data calculated by the image-feature-value calculating unit 223 at Step S506 and a best area extraction system evaluated by the area-extraction-result evaluating unit 225 (Step S509 shown in FIG. 17). FIG. 21 is a schematic diagram of an example of the supervised feature value data recorded in the supervised-feature-value-data recording unit 226. In the example shown in FIG. 21, best area extraction systems (in the example in FIG. 21, represented as "A", "B", "C", and "D") are regarded as labels of classes to which "teacher data", i.e., learning image data belongs.

When it is judged that the processing at Steps S505 to S509 explained above is executed on all the N image data recorded in the learning-image-data recording unit 222 (NO at Step S504 shown in FIG. 17), process control proceeds to Step S511 and learning processing for area extraction system selection rules is executed by the area-extraction-system-selection-rule learning unit 227.

The area-extraction-system-selection-rule learning unit 227 learns a correspondence relation between an image feature value and optimum area extraction processing (Step S511 shown in FIG. 17). Specifically, the area-extraction-system-selection-rule learning unit 227 learns selection rules for an optimum area extraction system from the image feature value using supervised feature value data and a pattern identification algorithm. As a learning system, arbitrary learning systems can be employed such as linear identification, a neural network, a nearest neighbor method, and a support vector machine.

When unknown document image data is input, the area-extraction-system selecting unit 228 calculates an image feature value and selects an area extraction system optimum for the image data by using area extraction system selection rules that has been obtained by learning by the area-extraction-system-selection-rule learning unit 227. Consequently, by causing the area extraction system of selected one of the area extracting units 224 to act on the input document image data, various areas are extracted from the input document image data.

As described above, according to the third embodiment, it is possible to automatically learn correspondence rules between an image feature value of document image data, which is calculated based on an outline of a layout (rough spatial arrangement, distribution, and the like of characters and photographs or pictures), and an area extraction system. An area extraction system in a layout analysis is selected based on associated information, and the document image data is divided into areas based on the selected area extraction system. This makes it possible to quickly calculate an image feature value, which characterizes a type of an image, according to the outline of the layout (rough spatial arrangement, distribution, and the like of characters, photographs or pictures). Furthermore, an area extraction system in a layout analysis suitable for a feature of the document image data can be selected. Therefore, it is possible to improve performance of document area extraction.

The area-extraction-result evaluating unit 225 collates the output results of the area extraction systems with the correct answer of the extracted area prepared for each of learning image data to thereby calculate a difference between the correct answer and each of the outputs and ranks the area identification systems caused to act on the image data. However, the present invention is not limited to this. It is also possible that a correct answer is not prepared and a human operator visually recognizes output results of a plurality of area extraction systems and ranks the area extraction systems.

In the third embodiment, the image-feature-value calculating unit 223 calculates a feature value of entire image data (Step S506 shown in FIG. 17). Then, the area extracting units 224 perform area extraction (Step S507 shown in FIG. 17) and the area-extraction-result evaluating unit 225 evaluates output results of the area extracting units 224 of the area extraction systems (Step S508 shown in FIG. 17). However, the present invention is not limited to this. For example, it is also possible that the area extracting units 224 perform area extraction and the area-extraction-result evaluating unit 225 evaluates output results of the area extracting units 224 of the area extraction systems and, then, the image-feature-value calculating unit 223 calculates a feature value of entire image data.

A fourth embodiment of the present invention is explained below with reference to FIG. 22. Components same as those in the first to the third embodiments are denoted by the same reference numerals and signs and explanation of the components is not repeated.

In the first to the third embodiments, a computer such as a PC is applied as the data processing apparatus 1. However, in the forth embodiment, an information processing apparatus included in a digital multifunction product and the like is applied as the data processing apparatus 1.

Figure 22:
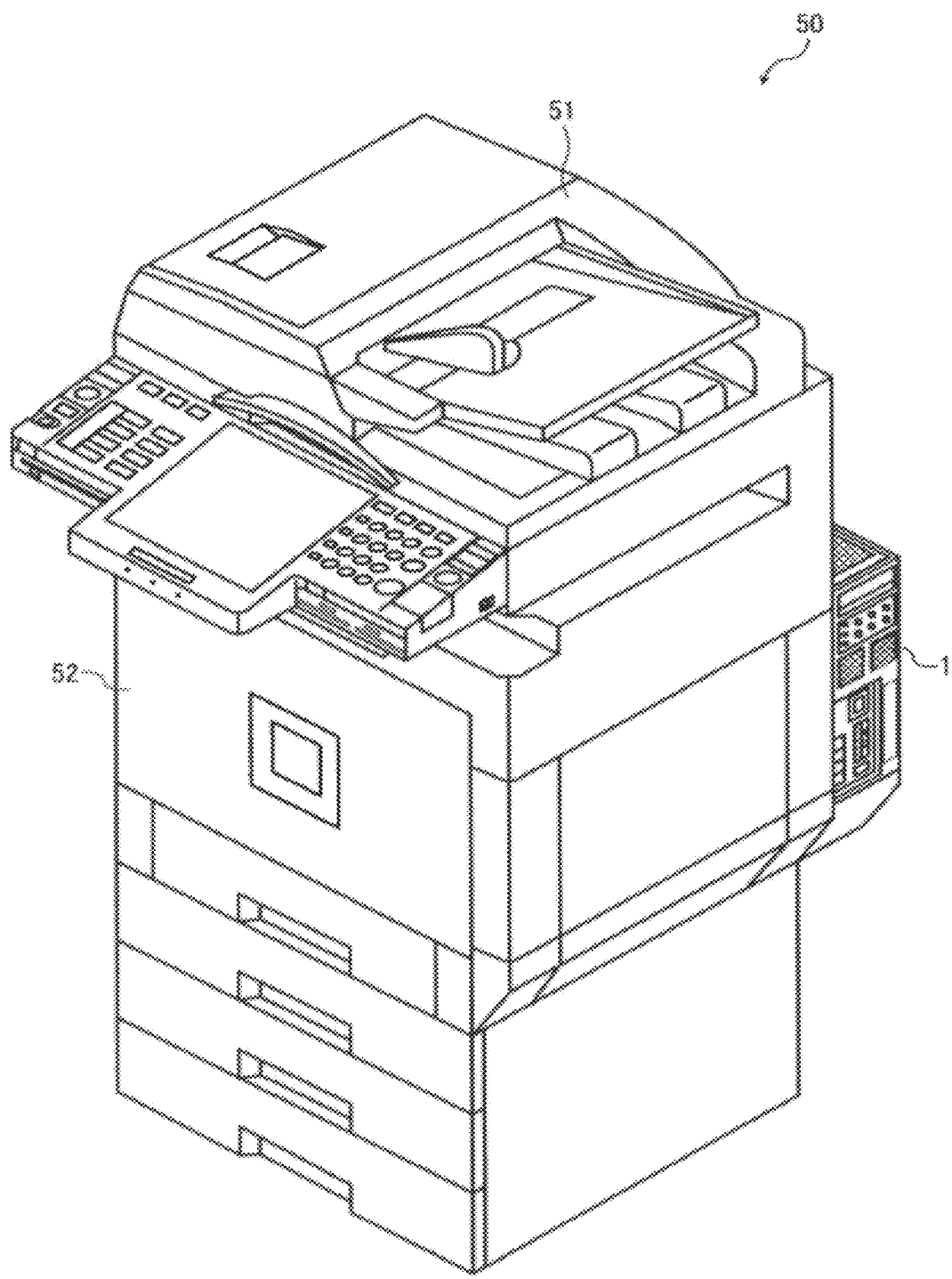
FIG. 22 is an external perspective view of a digital multifunction product according to a fourth embodiment of the present invention.

FIG. 22 is an external perspective view of a digital multifunction peripheral 50 according to the fourth embodiment. The data processing apparatus 1 is applied to an information processing apparatus included in the digital multifunction peripheral 50. The digital multifunction peripheral 50 is an image forming apparatus that includes a scanner unit 51 as image scanning means and a printer unit 52 as an image printing apparatus. Image processing is performed on a scan image scanned by the scanner unit 51 of the digital multifunction peripheral 50.

A fifth embodiment of the present invention is explained below with reference to FIG. 23. Components same as those in the first to the third embodiments are denoted by the same reference numerals and sings and explanation of the components is not repeated.

In the first to the third embodiments, a local system (e.g., a single personal computer) is applied as the data processing apparatus 1. However, in the fifth embodiment, a server computer configuring a server client system is applied as the data processing apparatus 1.

Figure 23:
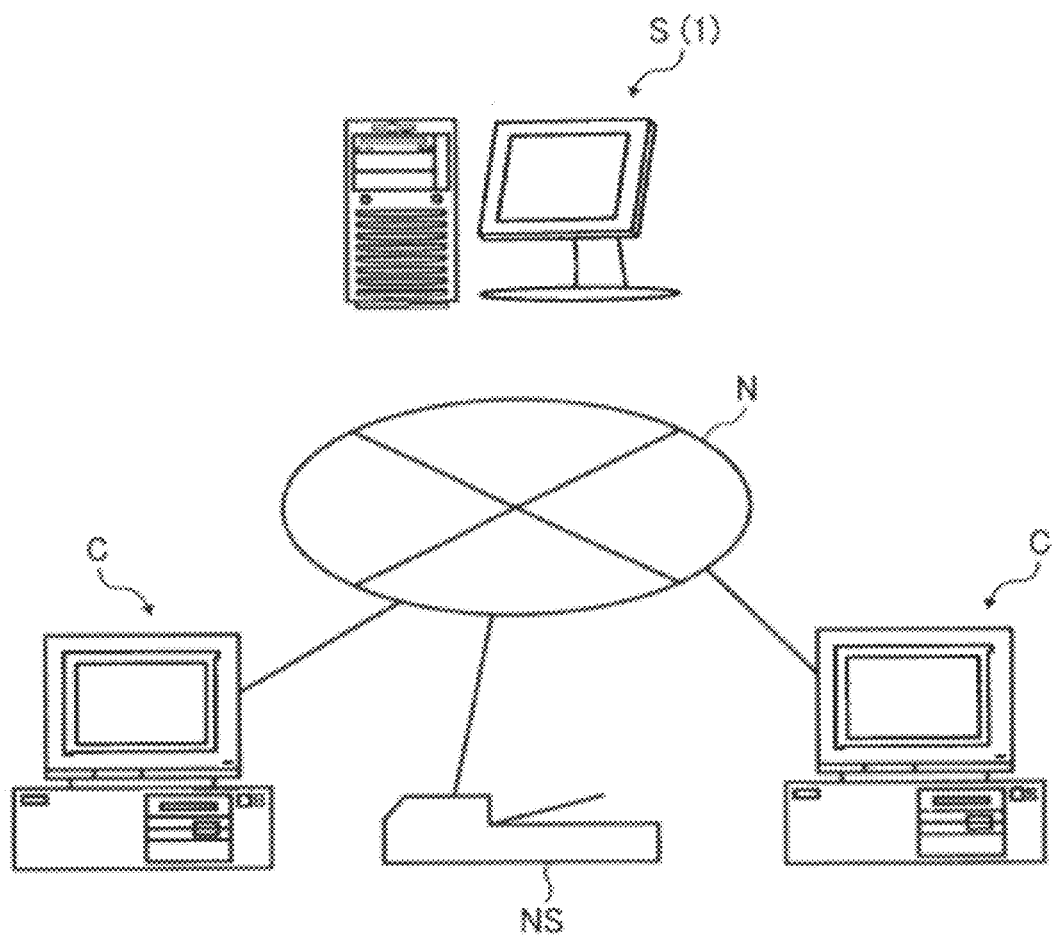
FIG. 23 is a schematic diagram of a server client system according to a fifth embodiment of the present invention.

FIG. 23 is a schematic diagram of a server client system according to the fifth embodiment. In the server client system, a plurality of client computers C is connected to a server computer S through a network N. The client computers C transmit images to the server computer S. The server computer S (the data processing apparatus 1) performs image processing on the images. A network scanner NS is provided on the network N.

According to an aspect of the present invention, optimum functions for new image data is predicted and recommended to a user based on a set of cases including image feature values of image data processed so far and functions of image data selected by the user. This makes it possible to cope with methods of classification peculiar to respective users and allows the user to obtain desired functions with little operation (selection from a menu and setting). Therefore, when the user designates a function for each of a large quantity of images, it is possible to realize improvement of work efficiency without imposing a burden on user operation while taking into account the methods of classification peculiar to the respective users.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data processing apparatus comprising:
 a feature-value calculating unit that calculates an image feature value indicating a feature of image data;
 a case database including a case set including a correspondence of image feature values and functions;
 an optimum-function predicting unit that predicts an optimum function based on the case database and the image feature value calculated by the feature-value calculating unit;
 an area extracting unit that executes area extraction on the image data by using at least two area extraction systems;
 an evaluating unit that ranks each of extracted areas obtained by the area extraction systems and evaluates the area extraction systems;
 a feature-value-data recording unit that records, as supervised feature value data, the image feature value and a best one of the area extraction systems based on evaluation by the evaluating unit; and
 a learning unit that learns a selection rule for selecting the best area extraction system from the image feature value using the supervised feature value data, wherein
 the data processing apparatus builds the case database.

2. The data processing apparatus according to claim 1, further comprising:
 a weight calculating unit that calculates a weight for each case in the case set; and
 a case-set building unit that builds, in the case data base, a new case set in which number of cases is reduced based on the weight, wherein
 the optimum-function predicting unit predicts an optimum function based on the new case set, the weights, and the image feature value.

3. The data processing apparatus according to claim 2, wherein the optimum-function predicting unit includes
 a distance calculating unit that calculates, for each case in the new case set, a weighted distance of a feature value vector to the image data; and
 a unit that outputs, as an optimum function from the new case set, a case in which the distance is minimized.

4. The data processing apparatus according to claim 1, wherein the feature-value calculating unit includes
 a block dividing unit that exclusively divides the image data into rectangular blocks;
 a block classifying unit that classifies the blocks into one of predetermined elements that form the image data; and
 a calculating unit that calculates an image feature value of the image data based on a result of classification of the blocks.

5. The data processing apparatus according to claim 4, wherein the block classifying unit includes
 an image generating unit that generates a plurality of images having different resolutions from the blocks;
 a feature-value-vector calculating unit that calculates a feature value vector from each of the images; and
 a classifying unit that classifies the blocks into one of predetermined elements based on the feature value vector.

6. The data processing apparatus according to claim 5, wherein the feature-value-vector calculating unit includes
 a binarizing unit that binarizes each of the images;
 a pixel-feature calculating unit that calculates a feature for each pixel of each binarized image based on values of each of the pixels and a pixel corresponding to a local pattern formed of neighboring pixels near each of the pixels; and
 an adding unit that adds up, over the entire image, features calculated for the pixels.

7. The data processing apparatus according to claim 5, wherein the feature-value-vector calculating unit includes a pixel-feature calculating unit that calculates a feature for each pixel of the images based on values of each of the pixels and a pixel corresponding to a local pattern formed of neighboring pixels near each of the pixels; and an adding unit that adds up, over the entire image, features calculated for the pixels.

8. The data processing apparatus according to claim 1, further comprising a predictor building unit that builds a predictor that predicts an optimum function based on the case database, wherein the optimum-function predicting unit predicts an optimum function by using the predictor.

9. The data processing apparatus according to claim 8, wherein the optimum-function predicting unit includes a distance calculating unit that calculates a distance of a feature value vector between a prototype point and a target point of the image data, the prototype point being from the case set and to be used in the predictor.

10. The data processing apparatus according to claim 9, wherein the predictor building unit includes a batch building unit that rebuilds, upon judging that a predetermined series of works is finished, the predictor, and the predictor building unit uses all case sets in the case database.

11. The data processing apparatus according to claim 10, further comprising an input receiving unit that receives an input of a function from a user, wherein the batch building unit includes a supplementing unit that reduces, when the optimum function is different from the function received from the user, a volume of the case set and optimizes weight of prototype data such that a prediction error is minimized.

12. The data processing apparatus according to claim 11, wherein the supplementing unit includes a unit that adds new case data to the case set and deletes case data contradictory to the new case data from the case set; and a unit that updates weight of the prototype data for a near data group of the new case data.

13. The data processing apparatus according to claim 8, further comprising:

an input receiving unit that receives an input of a function from a user; and an updating unit that updates, when the optimum function is different from the function received from the user, the case set to a sum set of a new case set from the user and the case set, wherein the predictor building unit includes a sequential building unit that rebuilds, every time the case set is updated by the updating unit, a predictor using updated case set.

14. The data processing apparatus according to claim 13, wherein the optimum-function predicting unit includes a distance calculating unit that calculates a distance of a feature value vector between prototype data and the image data, the prototype data being from among the case set and to be used in the predictor.

15. The data processing apparatus according to claim 13, wherein the updating unit includes a unit that detects a set of pieces of case data having feature value vectors of substantially same values and indicating different functions among case sets in the case database.

16. The data processing apparatus according to claim 13, wherein the sequential building unit includes a parameter updating unit that updates, every time new image data is input from a user, a parameter of a distance function for prototype data having a feature value close to an image feature value calculated from the new image data among case data in the case set.

17. The data processing apparatus according to claim 16, wherein the parameter updating unit updates weight, the weight being determined based on the case data, such that a prediction error is minimized.

18. A non-transitory computer readable medium encoded with computer readable program codes, which when executed, causes a computer to execute a method comprising:

building a case database;

calculating an image feature value indicating a feature of image data;

predicting an optimum function based on the case database, the case data base including a case set including a correspondence of image feature values and functions, and the image feature value calculated at the calculating;

executing area extraction on the image data by using at least two area extraction systems;

ranking each of extracted areas obtained by the area extraction systems and evaluating the area extraction systems;

recording, as supervised feature value data, the image feature value and a best one of the area extraction systems based on the evaluating; and learning a selection rule for selecting the best area extraction system from the image feature value using the supervised feature value data.

19. A data processing method executed by a data processing apparatus including a control unit and a storing unit, the data processing method comprising:

building a case database;

calculating an image feature value indicating a feature of image data;

predicting an optimum function based on the case database, the case data base including a case set including a correspondence of image feature values and functions, and the image feature value calculated at the calculating;

executing area extraction on the image data by using at least two area extraction systems;

ranking each of extracted areas obtained by the area extraction systems and evaluating the area extraction systems;

recording, as supervised feature value data, the image feature value and a best one of the area extraction systems based on the evaluating; and learning a selection rule for selecting the best area extraction system from the image feature value using the supervised feature value data.

* * * * *